(12) United States Patent
Han

(10) Patent No.: US 12,159,440 B2
(45) Date of Patent: Dec. 3, 2024

(54) ELECTRONIC APPARATUS AND OPERATING METHOD OF THE ELECTRONIC APPARATUS

(71) Applicant: SK hynix Inc., Icheon-si (KR)

(72) Inventor: Ji Hee Han, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 312 days.

(21) Appl. No.: 17/585,283

(22) Filed: Jan. 26, 2022

(65) Prior Publication Data

US 2023/0109055 A1 Apr. 6, 2023

(30) Foreign Application Priority Data

Sep. 17, 2021 (KR) .................. 10-2021-0124510

(51) Int. Cl.
*H04N 25/60* (2023.01)
*G06T 5/50* (2006.01)
*G06T 5/70* (2024.01)
*G06V 10/22* (2022.01)

(52) U.S. Cl.
CPC .............. *G06V 10/22* (2022.01); *G06T 5/50* (2013.01); *G06T 5/70* (2024.01); *G06T 2207/20216* (2013.01); *G06T 2207/20224* (2013.01)

(58) Field of Classification Search
CPC ............. G06T 5/20; G06T 2207/20192; G06T 2207/20216; G06T 2207/20224; G06T 5/50; G06T 5/70; G06T 5/00; H04N 25/61; H04N 25/704; H04N 23/672; H04N 25/134; H04N 25/702; H04N 2201/0084; H04N 23/10; H04N 23/843; H04N 25/683; H04N 9/646; H04N 23/71; H04N 23/80; H04N 23/84; H04N 23/88; H04N 25/13; H04N 25/60; H04N 25/70; H04N 9/67; G06V 10/22

See application file for complete search history.

(56) References Cited

U.S. PATENT DOCUMENTS

| 8,270,754 | B2* | 9/2012 | Jiang | H04N 25/67 348/240.99 |
| 8,605,167 | B2* | 12/2013 | Cote | H04N 23/70 348/223.1 |
| 8,767,117 | B2* | 7/2014 | Miyashita | H04N 25/134 348/246 |
| 9,584,790 | B2* | 2/2017 | Barsoum | H04N 13/122 |
| 10,848,693 | B2 | 11/2020 | Agranov et al. | |

(Continued)

FOREIGN PATENT DOCUMENTS

| CN | 105306786 A | 2/2016 |
| CN | 110177226 A | 8/2019 |

(Continued)

*Primary Examiner* — Ian L Lemieux
(74) *Attorney, Agent, or Firm* — WILLIAM PARK & ASSOCIATES LTD.

(57) ABSTRACT

An electronic apparatus includes: an image sensor including normal pixels and phase detection pixels; and a processor for detecting a noise region in a flare region included in a normal image generated based on a plurality of pixel values sensed through the normal pixels and the phase detection pixels, and generating an output image including final pixel values obtained by correcting the pixel values, using peripheral pixel values of each of pixel values included in the noise region.

20 Claims, 30 Drawing Sheets

(56) References Cited

U.S. PATENT DOCUMENTS

| | | | |
|---|---|---|---|
| 2013/0002902 A1* | 1/2013 | Ito | H04N 25/61 |
| | | | 348/224.1 |
| 2013/0002911 A1 | 1/2013 | Miyashita et al. | |
| 2013/0002936 A1* | 1/2013 | Hirama | H04N 23/672 |
| | | | 348/349 |
| 2016/0142656 A1* | 5/2016 | Hirama | H04N 25/704 |
| | | | 348/242 |
| 2016/0373643 A1 | 12/2016 | Abe | |
| 2018/0338096 A1* | 11/2018 | Matsunaga | H04N 25/13 |
| 2020/0029035 A1 | 1/2020 | Agranov et al. | |
| 2023/0269496 A1* | 8/2023 | Yang | H04N 23/81 |

FOREIGN PATENT DOCUMENTS

| | | |
|---|---|---|
| JP | 2009182735 A | 8/2009 |
| KR | 101582800 B1 | 1/2016 |

* cited by examiner

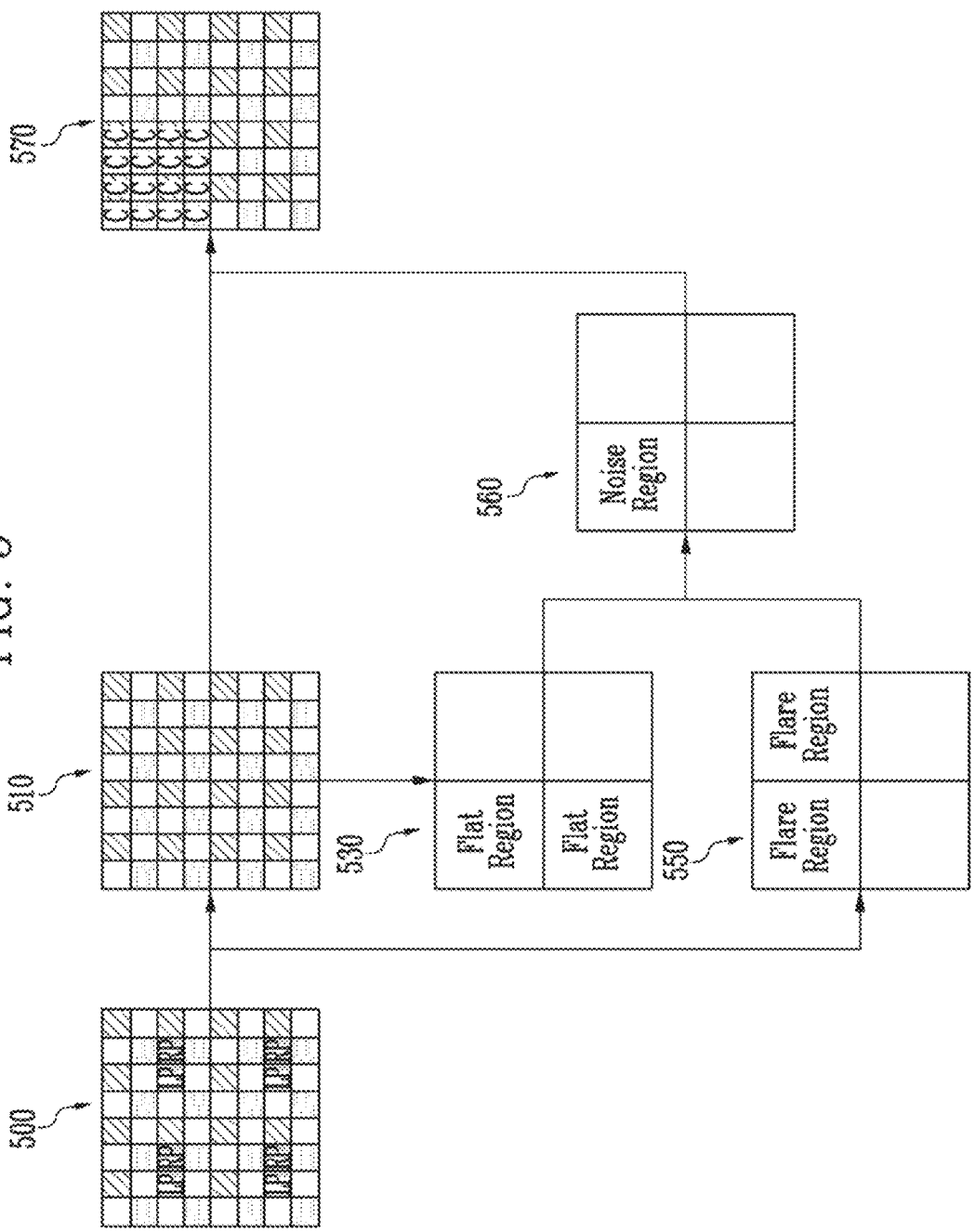

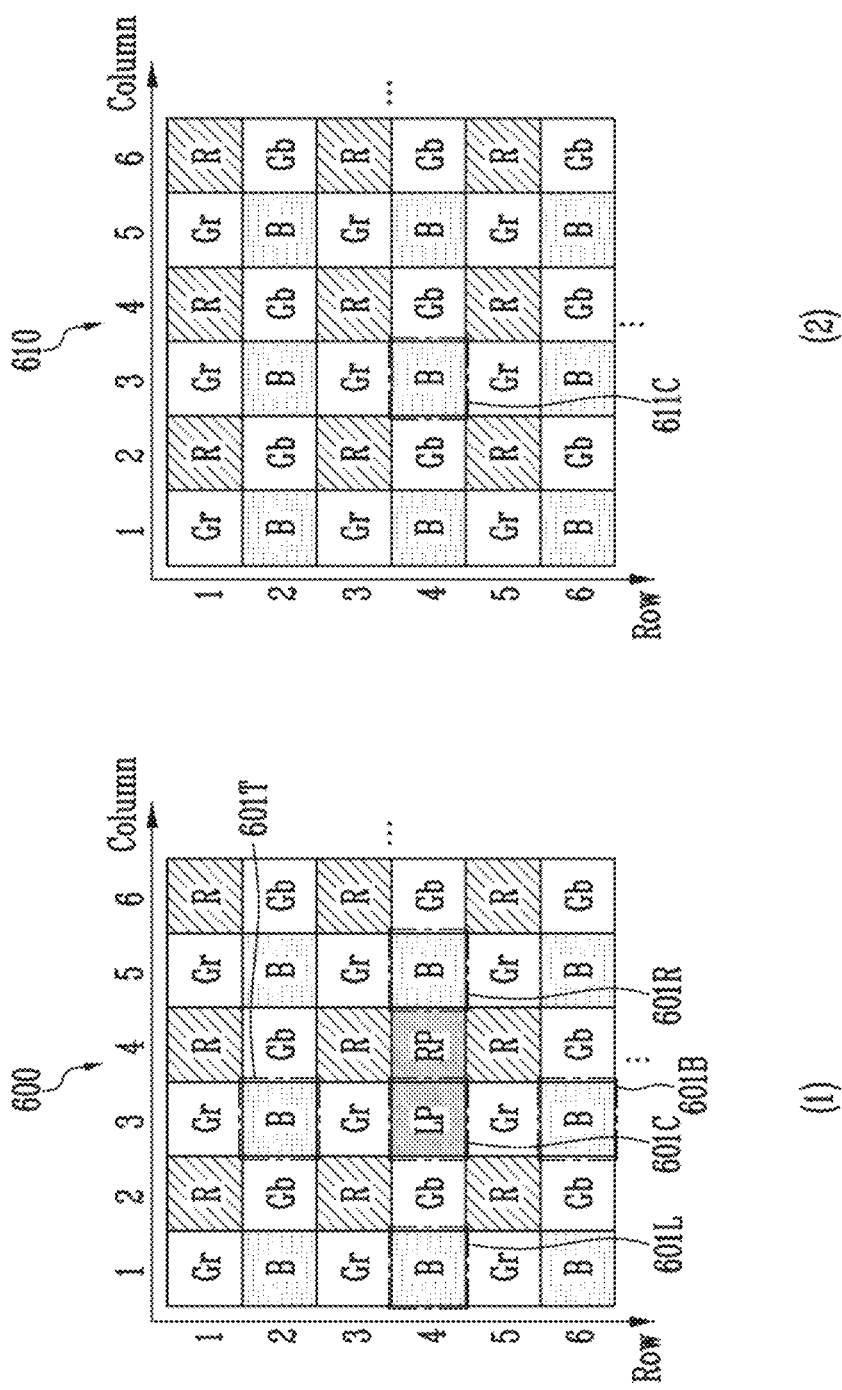

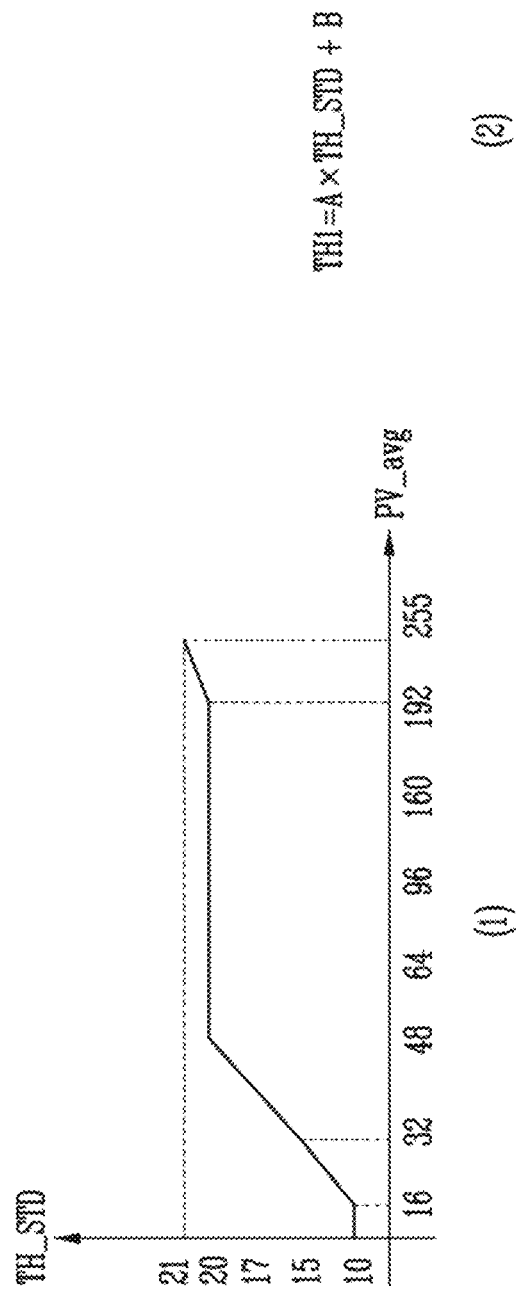

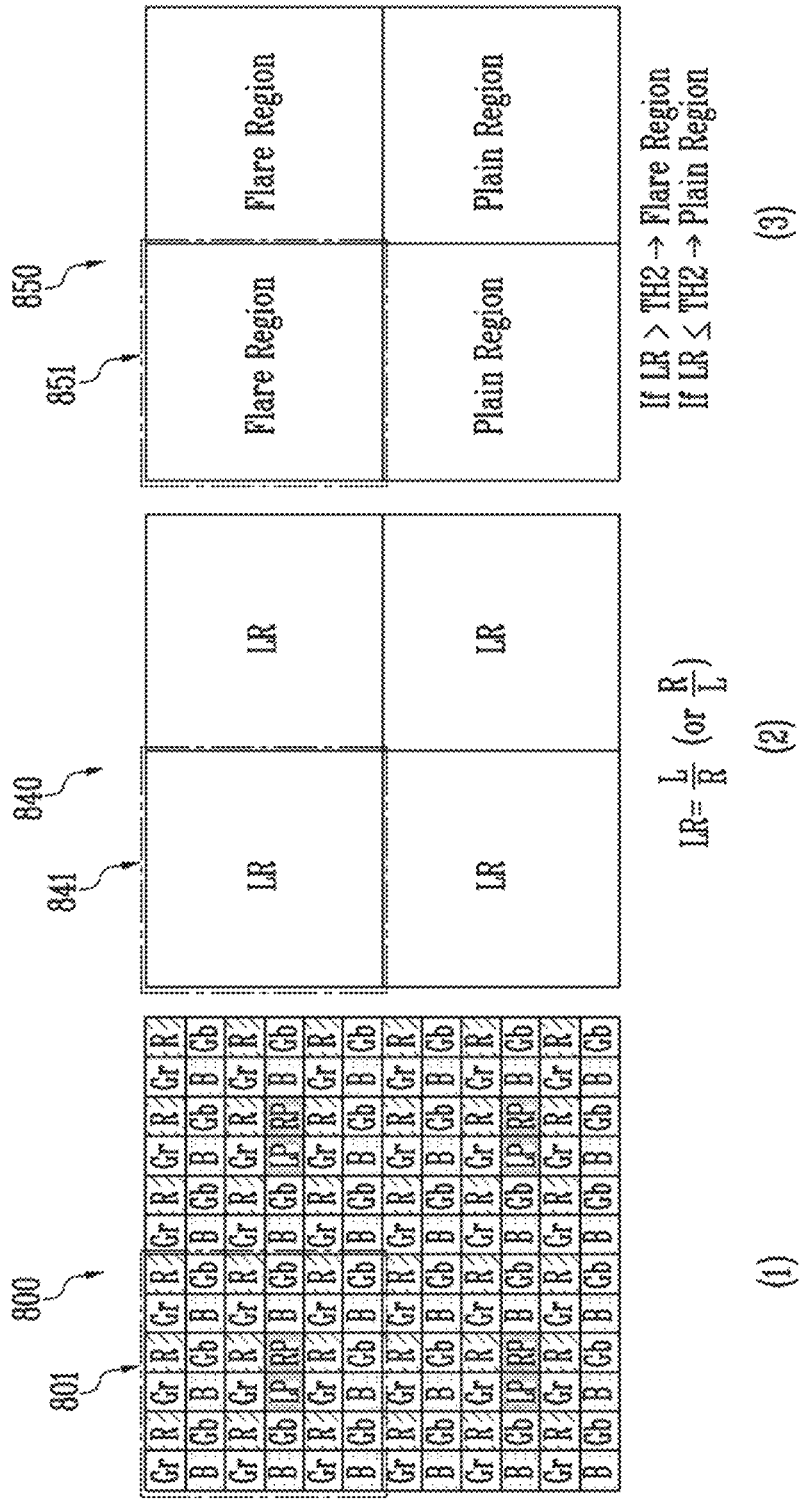

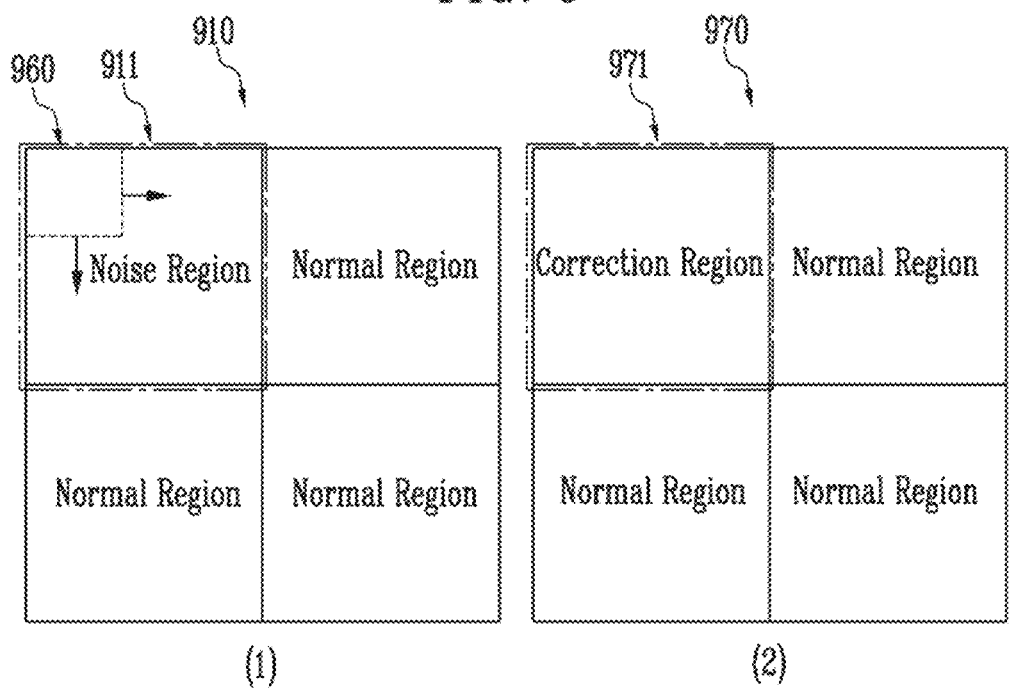

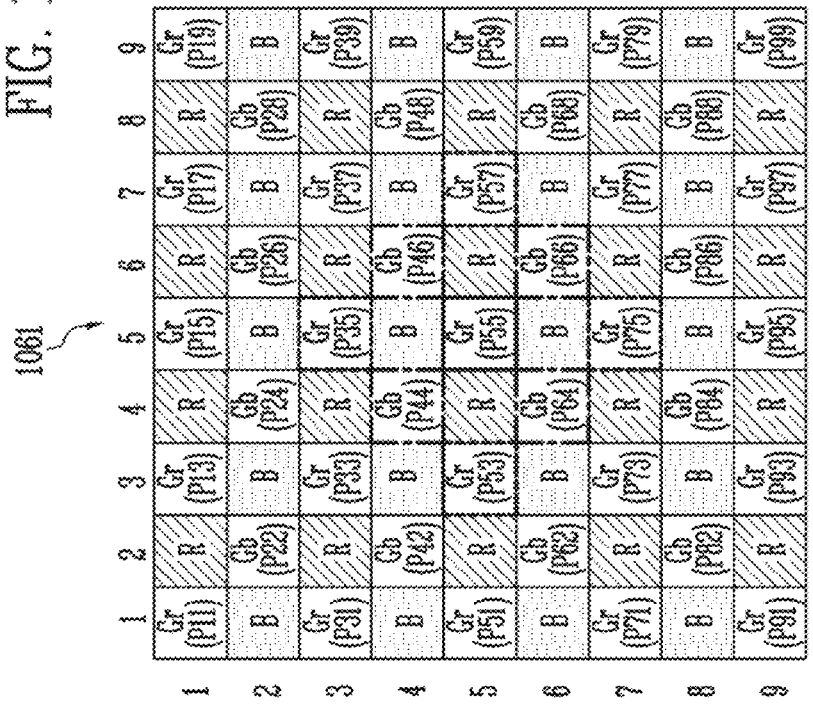

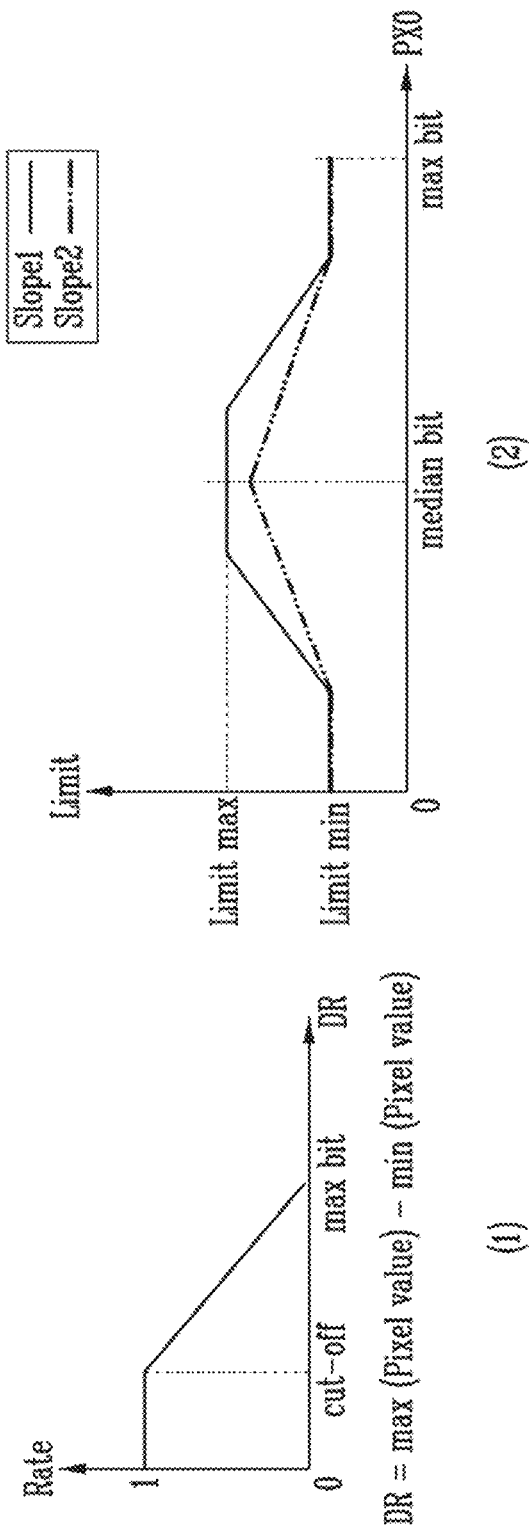

FIG. 11A

| | PX0_p (center) | PX1_p (1st level) | PX2_p (2nd level) | cPX0_p (center) |
|---|---|---|---|---|
| | P44 | P33,P35,P53,P55 | P24,P42,P46,P64 | cP44 |
| | P46 | P35,P37,P55,P57 | P26,P44,P48,P66 | cP46 |
| | P64 | P53,P55,P73,P75 | P44,P62,P66,P84 | cP64 |
| | P66 | P55,P57,P75,P77 | P46,P64,P68,P86 | cP66 |

$$cPX0\_p = PX0\_p + (AVG(PX1\_p) - AVG(PX2\_p)) \times gain \quad (2)$$

FIG. 11C $$fPX0 = \frac{cPX0 + \sum cPX0\_p}{9} \quad (2)$$

$$fP55 = \frac{cP55 + (cP44+cP46+cP64+cP66+cP35+cP53+cP57+cP75)}{9} \quad (3)$$

FIG. 12A

FIG. 12B $cA0 = A0 + A$, if $A <$ Limit
$cA0 = A0 +$ Limit, if $A \geq$ Limit $A = (AVG(A1) - AVG(A2)) \times gain \times rate$ (1)

$A0 = \{P55, P56, P65, P66\}$, $cA0 = \{cP55, cP56, cP65, cP66\}$
$AVG(A1) = AVG(\ AVG(A22),\ AVG(A24),\ AVG(A42),\ AVG(A44))$
$AVG(G2) = AVG(\ AVG(A13),\ AVG(A31),\ AVG(A35),\ AVG(A53))$ (2)

FIG. 12C $$cA22 = A22 + (AVG(A22)) - AVG\ (AVG(A11),\ AVG(A13),\ AVG(A31),\ AVG(A33)) \times gain$$

$$A22 = \{P33,\ P34,\ P43,\ P44\},\ cA22 = \{cP33,\ cP34,\ cP43,\ cP44\}$$

(2)

| A0_p (center) □ | | | | | |
| A1_p (1st level) □ | | | | | |
| A11 | A12 | A13 | A14 | A15 |
| A21 | A22 | A23 | A24 | A25 |
| A31 | A32 | A33 | A34 | A35 |
| A41 | A42 | A43 | A44 | A45 |
| A51 | A52 | A53 | A54 | A55 |

1263

FIG. 12D $cA24 = A24 + (AVG(A24)) - AVG\ (AVG(A13),\ AVG(A15),\ AVG(A33),\ AVG(A35)) \times gain$
$cA42 = A42 + (AVG(A42)) - AVG\ (AVG(A31),\ AVG(A33),\ AVG(A51),\ AVG(A53)) \times gain$
$cA44 = A44 + (AVG(A44)) - AVG\ (AVG(A33),\ AVG(A35),\ AVG(A53),\ AVG(A55)) \times gain$ (1)

FIG. 13B $cG0 = G0 + A$, if $A <$ Limit
$cG0 = G0 +$ Limit, if $A \geq$ Limit $A = (AVG(G1) - AVG(G2)) \times gain \times rate$ (1)

$G0 = \{P55, P56, P65, P66\}$, $cA0 = \{cP55, cP56, cP65, cP66\}$
$AVG(G1) = AVG(AVG(G11), AVG(G12), AVG(G13), AVG(G14))$
$AVG(G2) = AVG(AVG(G21), AVG(G22), AVG(G23), AVG(G24))$ (2)

FIG. 13C cG0_p = G0_p + (AVG(G0_p) − AVG (AVG(G11), AVG(G12), AVG(G13), AVG(G14)) × gain (2)

G0_p = {cG01, cG02, cG03, cG04}
     = {cP33, cP34, cP43, cP44} cG01
= G01 + (AVG(G01, G02, G03, G04) − AVG (AVG(G11), AVG(G12), AVG(G13), AVG(G14)) × gain
cG02
= G02 + (AVG(G01, G02, G03, G04) − AVG (AVG(G11), AVG(G12), AVG(G13), AVG(G14)) × gain
cG03
= G03 + (AVG(G01, G02, G03, G04) − AVG (AVG(G11), AVG(G12), AVG(G13), AVG(G14)) × gain
cG04
= G04 + (AVG(G01, G02, G03, G04) − AVG (AVG(G11), AVG(G12), AVG(G13), AVG(G14)) × gain (3)

$$fP55 = W \times cP55 + (1-W) \times \frac{(cP33+cP37+cP73+cP77)}{4}$$

$$fP56 = W \times cP56 + (1-W) \times \frac{(cP34+cP38+cP74+cP78)}{4}$$

$$fP65 = W \times cP65 + (1-W) \times \frac{(cP43+cP47+cP83+cP87)}{4}$$

$$fP66 = W \times cP66 + (1-W) \times \frac{(cP44+cP48+cP84+cP88)}{4}$$

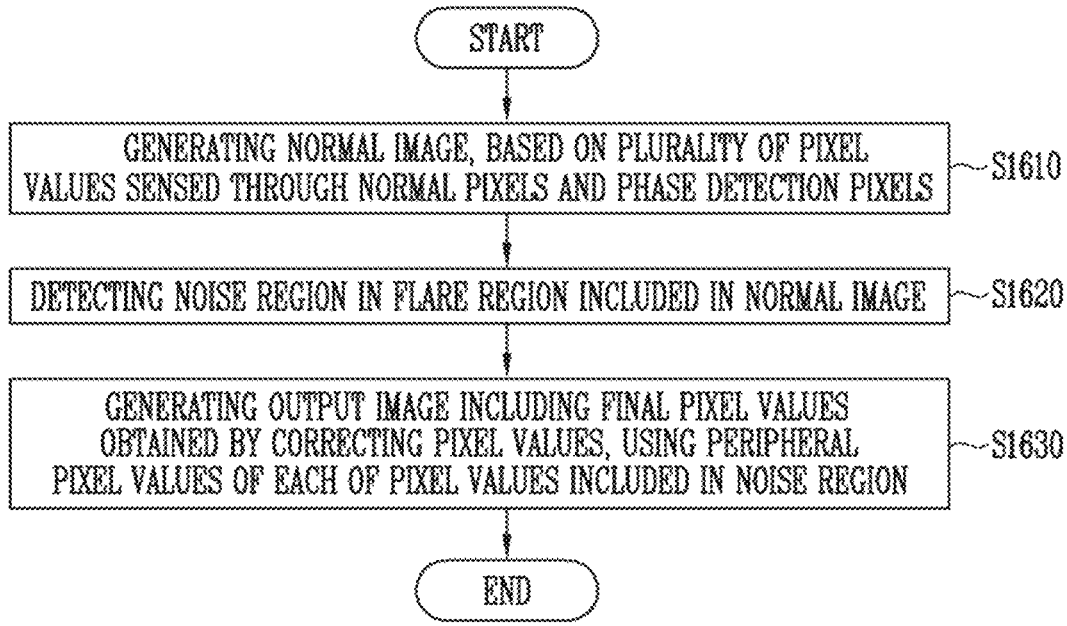

ELECTRONIC APPARATUS AND OPERATING METHOD OF THE ELECTRONIC APPARATUS

CROSS-REFERENCE TO RELATED APPLICATION

The present application claims priority under 35 U.S.C. § 119(a) to Korean patent application number 10-2021-0124510, filed on Sep. 17, 2021, in the Korean Intellectual Property Office, the entire disclosure of which is incorporated herein by reference.

BACKGROUND

1. Technical Field

The present disclosure generally relates to an electronic apparatus and an operating method of the electronic apparatus, and more particularly, to an electronic apparatus configured for performing image processing and an operating method of the electronic apparatus.

2. Related Art

Recently, with the development of electronic technology, demands for image sensors have increased in various electronic apparatuses including smart phones, digital cameras, game consoles, Internet of things, robots, surveillance cameras, medical cameras, autonomous vehicles, and the like.

An image sensor may generate an image by converting light into an electrical signal. To this end, the image sensor may include normal pixels for sensing light and phase detection pixels for focusing an object. The normal pixels may be arranged according to a Bayer pattern or the like. The phase detection pixels may be arranged instead of some normal pixels at some positions among positions at which the normal pixels are arranged. The phase detection pixel performs a focus adjustment function, but may be treated as a defect in a normal image. In order to solve this, a pixel value of the phase detection pixel may be compensated.

Meanwhile, when light is received to the image sensor from a light source having a strong intensity of the light, such as the sun or lighting, the image sensor may generate an image including a flare region. The flare region may include a high luminance region representing strong light and a peripheral region in which the light of the high luminance region is spread. When the pixel value of the phase detection pixel is compensated in the flare region by using the same method as a normal region instead of the flare region, a noise may occur, such as a dot noise in which a dot appears at a certain position or a grid noise in which a dark portion appears in a certain region. Accordingly, a technique for solving a problem whereby a noise occurs in the flare region is required.

SUMMARY

In accordance with an aspect of the present disclosure, there may be provided an electronic apparatus including: an image sensor including normal pixels and phase detection pixels; and a processor configured to detect a noise region in a flare region included in a normal image generated based on a plurality of pixel values sensed through the normal pixels and the phase detection pixels, and generate an output image including final pixel values obtained by correcting the pixel values, using peripheral pixel values of each of pixel values included in the noise region.

In accordance with another aspect of the present disclosure, there may be provided a method of operating an electronic apparatus, the method including: generating a normal image, based on a plurality of pixel values sensed through normal pixels and phase detection pixels; detecting a noise region in a flare region included in the normal image; and generating an output image including final pixel values obtained by correcting pixel values included in the noise region, using peripheral pixel values of each of the pixels.

BRIEF DESCRIPTION OF THE DRAWINGS

Examples of embodiments will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 3A, 3B, and 3C are diagrams illustrating pixels included in image sensors in accordance with embodiments of the present disclosure.

FIG. 5 is a diagram illustrating an image processing operation in accordance with an embodiment of the present disclosure.

FIG. 6 is a diagram illustrating an image in accordance with an embodiment of the present disclosure.

FIGS. 7A, 7B, and 7C are diagrams illustrating detection of a flat region in accordance with an embodiment of the present disclosure.

FIGS. 8A and 8B are diagrams illustrating detection of a flare region in accordance with an embodiment of the present disclosure.

FIG. 9 is a diagram illustrating correction of a noise region in accordance with an embodiment of the present disclosure.

FIGS. 10A and 10B are diagrams illustrating primary correction of a central pixel in accordance with an embodiment of the present disclosure.

FIGS. 11A, 11B, and 11C are diagrams illustrating secondary correction of the central pixel in accordance with an embodiment of the present disclosure.

FIGS. 12A, 12B, 12C, 12D, and 12E are diagrams illustrating correction of an image having a quad Bayer pattern in accordance with an embodiment of the present disclosure.

FIGS. 13A, 13B, 13C, 13D, and 13E are diagrams illustrating correction of an image having a quad Bayer pattern in accordance with an embodiment of the present disclosure.

FIG. 16 is a diagram illustrating an operating method of an electronic apparatus in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Embodiments provide an electronic apparatus for removing a noise in a flare region and an operating method of the electronic apparatus.

Figure 1:
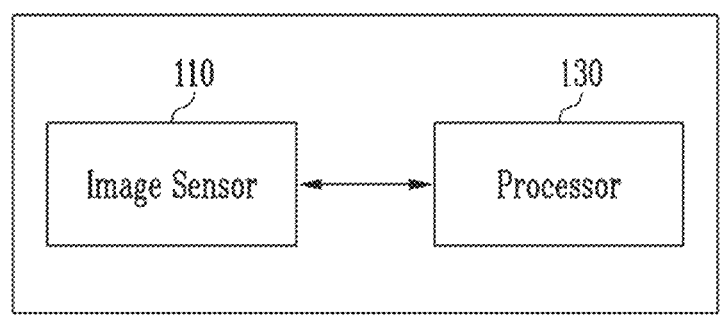
FIG. 1 is a diagram illustrating an electronic apparatus in accordance with an embodiment of the present disclosure.

FIG. 1 is a diagram illustrating an electronic apparatus in accordance with an embodiment of the present disclosure.

Referring to FIG. 1, the electronic apparatus 100 in accordance with the embodiment of the present disclosure may include an image sensor 110 and a processor 130.

The electronic apparatus 100 in accordance with the embodiment of the present disclosure may be an image pickup device, a digital camera, a camcorder, a closed-circuit television (CCTV), a webcam, a security camera, an industrial vision camera, a mobile device, a smart phone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, a vehicle vision camera, a set top box, a game console, an electronic dictionary, an electronic book reader, a desktop computer, a server, an MP3 player, a smart medical device, a television, a digital video disk (DVD) player, an audio, a refrigerator, an air conditioner, a vacuum cleaner, an oven, a microwave oven, a washing machine, an air cleaner, a smart mirror, a smart window, an electronic key, an electronic frame, a digital advertising board, a security control panel, or the like. The wearable device may be a smart watch, a ring, a bracelet, an anklet, a necklace, glasses, a contact lens, a head-mounted device (HMD), a skin pad, an electronic tattoo, or a bio-implantable type circuit, or the like.

The electronic apparatus 100 in accordance with the embodiment of the present disclosure may be implemented in the form of a packaged module, part or the like. That is, the electronic apparatus 100 may operate as one component included in a computing system. The computing system may be implemented as, for example, various devices including a digital camera, a mobile device, a smart phone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, and the like.

The image sensor 110 may acquire an image by sensing light. To this end, the image sensor 110 may be implemented as a Charged Coupled Device (CCD) image sensor, a Complementary Metal Oxide Semiconductor (CMOS) image sensor, or the like.

The image sensor 110 may include a plurality of pixels. The plurality of pixels may be arranged along row and columns. Specifically, the image sensor 110 may include normal pixels and phase detection pixels. The image sensor 110 may acquire an image including pixel values sensed by the normal pixels and pixel values sensed by the phase detection pixels.

The normal pixel may be a pixel including a color filter and a sensing circuit, which are disposed on the bottom of one microlens. The color filter is used to sense light of a specific color or a specific wavelength. For example, the color filter of a green color may sense light of the green color. The phase detection pixel may be a pixel including a sensing circuit disposed on the bottom of a portion of one microlens. That is, the phase detection pixel may be a pixel sharing the one microlens with another phase detection pixel. For example, a left phase detection pixel may sense light received through only a left portion of a microlens, and a right phase detection pixel may sense light received through only a right portion of the microlens. A left-right phase difference may be detected by comparing pixel values respectively sensed by the left phase detection pixel and the right phase detection pixel, and then, a left-right phase difference may be detected by adjusting a focus on an object and again sensing light. Such an operation is repeated until the left-right phase difference is reduced, so that the focus on the object can be automatically adjusted.

An image may include pixel data. The pixel data may be acquired through a plurality of pixels. One pixel data may include information associated with one pixel which acquires the corresponding pixel data. Specifically, the pixel data may include information on a pixel value, a color, and a position. The pixel value may represent brightness of light sensed by the corresponding pixel. The pixel value may have a value within a range of an allocated data bit. For example, when the data bit corresponds to 8 bits, the pixel value may have a natural number value within a range of 0 to 255. When the data bit corresponds to 10 bits, the pixel value may have a natural number value within a range of 0 to 1023. The position may represent a row and a column on which the corresponding pixel is arranged. The color may represent a color of light sensed by the corresponding pixel. For example, the color may be one of red, green, and blue. However, this is merely an embodiment, and the color is not limited to the above-described colors. Meanwhile, the pixel data may include information on a pixel kind, which represents whether the corresponding pixel is a normal pixel or a phase detection pixel.

The processor 130 may control overall operations of the electronic apparatus 100. To this end, the processor 130 may include at least one processing device. For example, the processor 130 may include at least one of an image signal processor (ISP), a digital signal processor (DSP), an application processor (AP), a graphics processing unit (GPU), a central processing unit (CPU), a controller, and the like.

The processor 130 may control the image sensor 110 to acquire an image, when a user request is received. Specifically, the processor 130 may receive the user request through an input interface. For example, the input interface may be implemented as one of a touch sensing panel, a keyboard, a mouse, a button, a microphone, and the like. Alternatively, the processor 130 may receive the user request from an external device through a communication interface. The processor 130 may transmit, to the image sensor 110, a command instructing the image sensor 110 to acquire the image. Also, the processor 130 may receive the image acquired from the image sensor 110. The image may include pixel values sensed through the normal pixels and pixel values sensed through the phase detection pixels.

The processor 130 may detect a noise region in a flare region included in a normal image generated based on a plurality of pixel values sensed through the normal pixels and the phase detection pixels. The processor 130 may generate an output image including final pixel values obtained by correcting the pixel values, using peripheral pixel values of each of pixel values included in the noise region.

The normal image may represent an image in which the pixel values sensed through the phase detection pixels are compensated as normal pixel values. The flare region may include a high luminance region representing a light source having a strong intensity of light, such as the sun or lighting, or an object reflecting strong light, and a peripheral region in which light is spread from the high luminance region.

The noise region may be a region in which a noise such as a dot noise or a grid noise occurs in the flare region or a region in which it is expected that a noise will occur in the flare region. In accordance with an embodiment, the noise region may be a region satisfying a condition in which the region corresponds to the flare region and a flat region. The flat region is a region except a texture, an edge, and the like in an image, and may represent a region having a small difference in brightness with the peripheral region. For example, the flat region may represent a low frequency region in a frequency domain.

As described above, in accordance with an embodiment of the present disclosure, the electronic apparatus 100 capable of removing a noise of the flare region and an operation method thereof can be provided. Hereinafter, the present disclosure will be described below with reference to the accompanying drawings.

Figure 2:
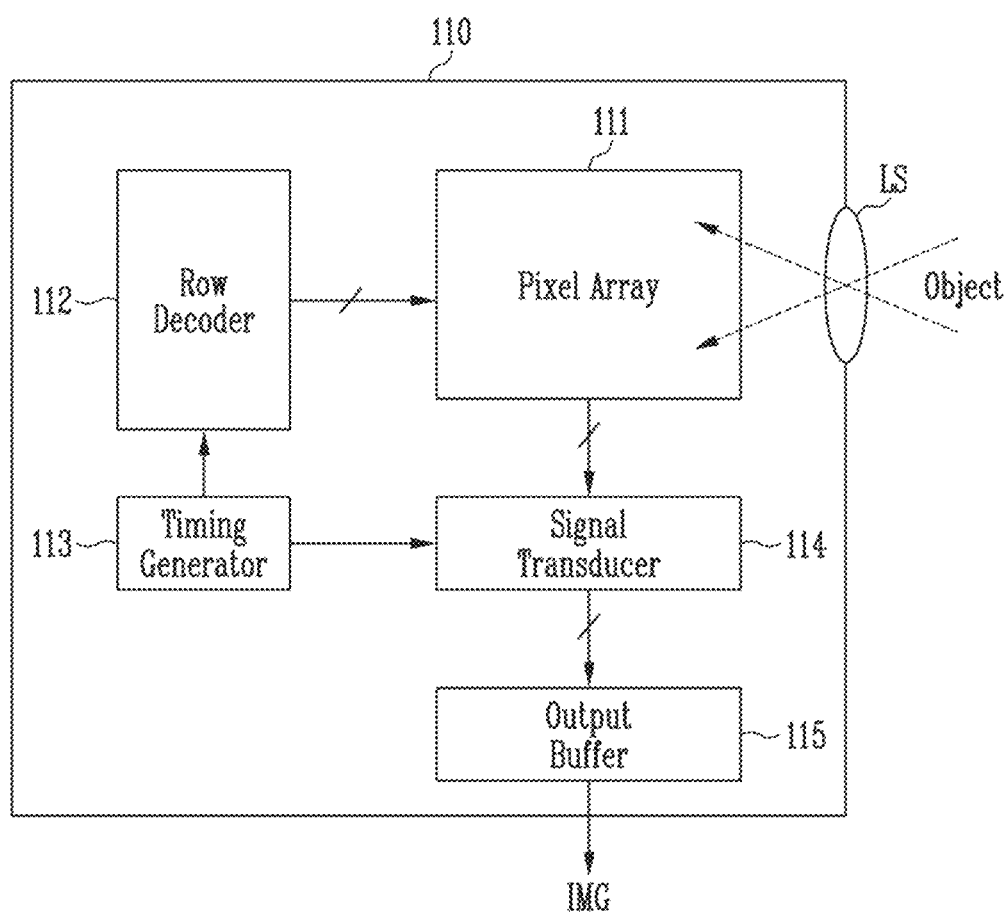
FIG. 2 is a diagram illustrating an image sensor in accordance with an embodiment of the present disclosure.

FIG. 2 is a diagram illustrating an image sensor in accordance with an embodiment of the present disclosure.

Referring to FIG. 2, the image sensor 110 may include an optical lens LS, a pixel array 111, a row decoder 112, a timing generator 113, a signal transducer 114, and an output buffer 115.

The optical lens LS may refract incident light. The light refracted through the optical lens LS may be transferred to the pixel array 111. To this end, the optical lens LS may be an assembly of microlenses arranged on the pixel array 111. Meanwhile, the light may include information on an object, such as a size, a shape, a position, a color, and the like of the object. The object may be a subject to be photographed, such as a person, a thing, an animal, or a plant, which exists at the outside.

The pixel array 111 may include a plurality of pixels. The plurality of pixels may be arranged in a row direction and a column direction. The pixels of the pixel array 111 may respectively correspond to pixel values of an image IMG. The pixels of the pixel array 111 may be ones arranged in a physical region, and the pixel values of the image IMG may be ones arranged in a digital region. A pixel of the pixel array 111 and a pixel value of the image IMG may have a corresponding relationship with respect to the same arrangement position.

Each pixel may include a color filter and a sensing circuit. The pixels may be arranged according to various arrangement forms such as a Bayer pattern and a quad Bayer pattern. This will be described below with reference to FIGS. 3A to 3C.

The color filter may be disposed between the microlens and the sensing circuit. Light refracted through the microlens may reach the sensing circuit while passing through the color filter. The color filter may function to allow light of a specific color or a specific wavelength to pass therethrough and block light of the other colors or the other wavelengths. The color filter may have a color corresponding to one of red, green, and blue. The pixel may be designated as a red pixel, a green pixel, or a blue pixel according to the color of the color filter included in the pixel. However, this is merely an embodiment, and the color of the color filter may be variously changed.

The sensing circuit may be disposed on the bottom of the color filter. The sensing circuit may include a light sensing element. The light sensing element may generate an electrical pixel signal from light received using a photoelectric effect. For example, when light is received to the light sensing element for an exposure time, charges corresponding to the light may be accumulated in the sensing circuit, and a pixel signal corresponding to the charges accumulated in the sensing circuit may be generated. To this end, the light sensing element may be implemented as various semiconductor elements such as a pn junction diode, a Positive-Intrinsic-Negative (PIN) photo diode, an Avalanche Photo Diode (APD), and a photo transistor.

The row decoder 112 may select pixels for reading pixel data under the control of the timing generator 113. For example, the row decoder 112 may select pixels located on a row corresponding to an address output from the timing generator 113 among the plurality of pixels included in the pixel array 111 in response to the address and control signals.

The timing generator 113 may control the row decoder 112 and the signal transducer 114 to read pixel data from pixels located on a specific row in the pixel array 111. For example, the timing generator 113 may sequentially output, to the row decoder 112, a row address representing the pixels located on the specific row. The timing generator 113 may output, to the row decoder 112, a command for adjusting an exposure time of a pixel located on a specific column.

The signal transducer 114 may acquire pixel data by using pixel signals received from the pixel array 111 and a row address received from the timing generator 113. Also, the signal transducer 114 may transfer the pixel data to the output buffer 115.

Specifically, the signal transducer 114 may be connected to the pixels of the pixel array 111 through a plurality of column lines. Pixels in proportion to the number of rows connected to one column line. The signal transducer 114 may receive pixel signals with respect to pixels located on one row through each column line. That is, the signal transducer 114 may receive pixel signals in units of rows. The signal transducer 114 may acquire a pixel value corresponding to the level of a pixel signal received from the pixel array 111. The pixel signal may be, for example, a voltage. To this end, the signal transducer 114 may include an analog-digital converter. Also, the signal transducer 114 may acquire information on a color of pixels located on a row corresponding to a row address received from the timing generator 113, based on color information of pixels mapped to each of row addresses.

The output buffer 115 may be connected to the signal transducer 114 through the plurality of column lines. The output buffer 115 may sequentially store pixel values in units of rows, which are received from the signal transducer 114. When pixel values with respect to all rows are stored, the output buffer 115 may output one image IMG including the stored pixel values.

Figure 3A:
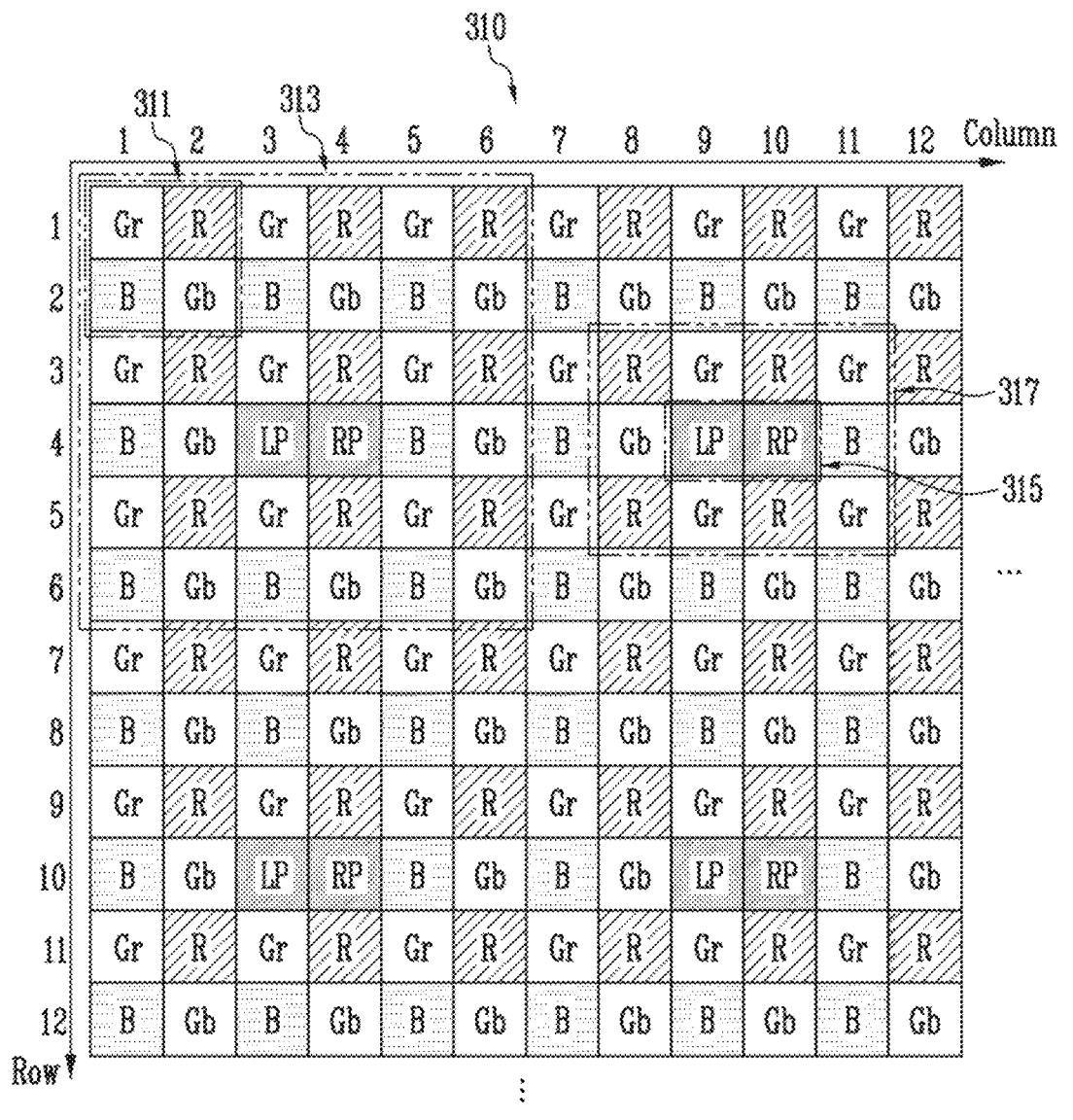
Figure 3B:
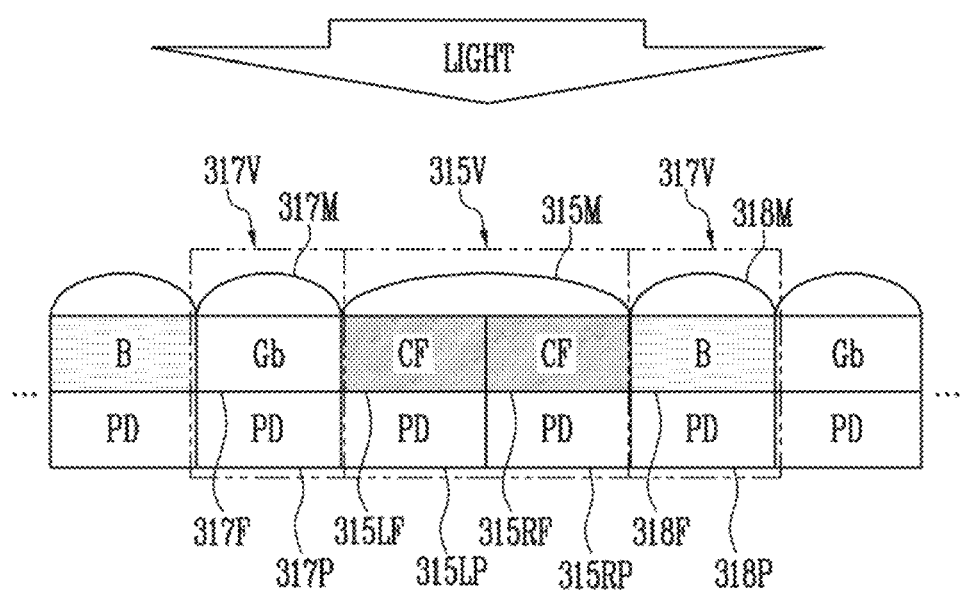
Figure 3C:
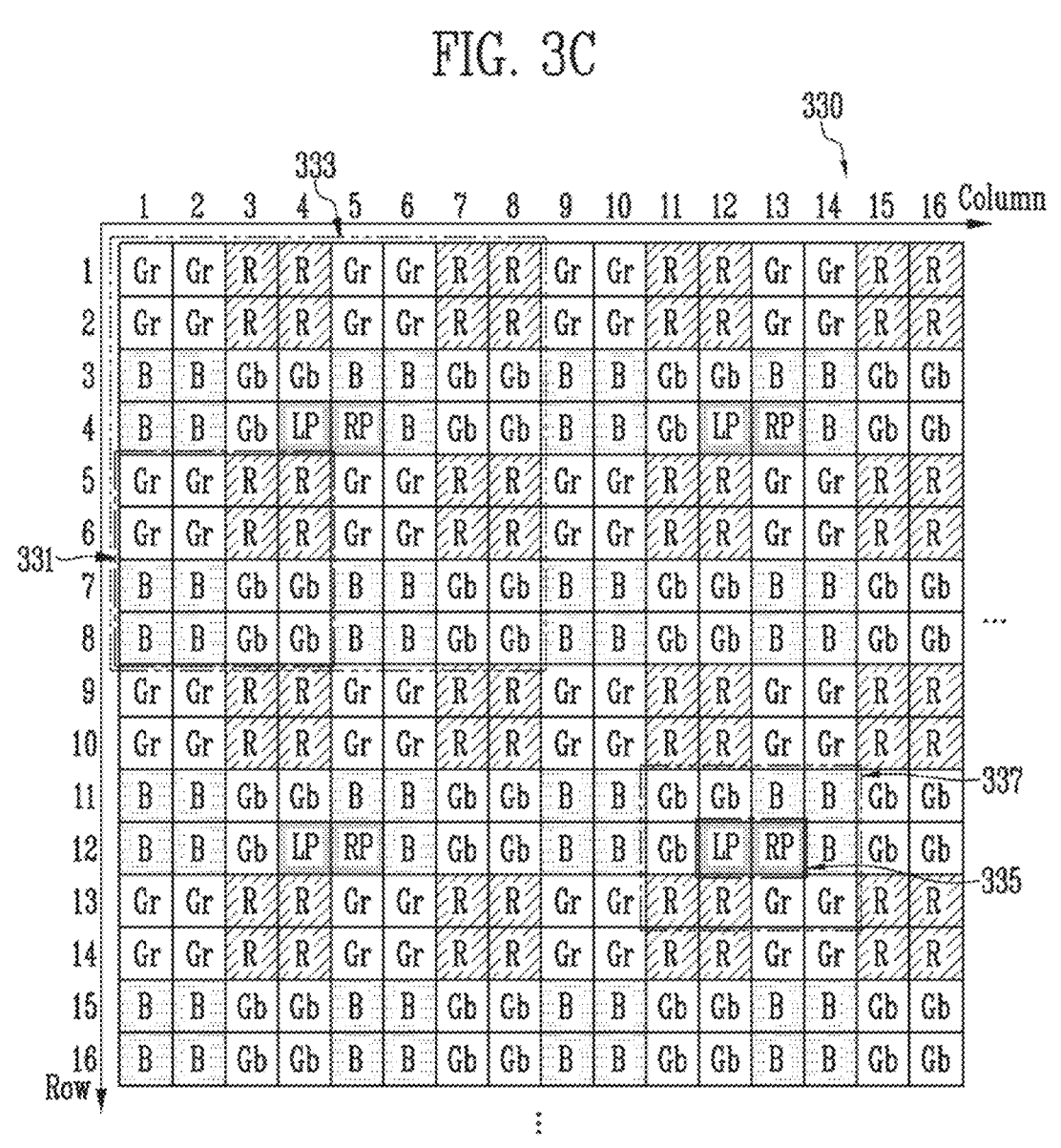

FIGS. 3A to 3C are diagrams illustrating pixels included in image sensors in accordance with embodiments of the present disclosure.

Referring to FIGS. 3A to 3C, each of the image sensors 310 and 330 in accordance with the embodiments of the present disclosure may include a plurality of pixels. The plurality of pixels may be arranged with a fixed number along row and column directions. The plurality of pixels may include normal pixels and phase detection pixels. In accordance with an embodiment, the normal pixels may include a Gr pixel, an R pixel, a B pixel, and a Gb pixel. The Gr pixel (or a first green pixel) and the Gb pixel (or a second green pixel) may sense light of a green (Gr and Gb) color, the R pixel (or a red pixel) may sense light of a red (R) color, and the B pixel (or a blue pixel) may sense light of a blue (B) color. However, this is merely an embodiment, and the normal pixels may be modified as pixels sensing light of various colors. Hereinafter, for convenience of description, it is assumed and described that the normal pixels include the Gr pixel, the R pixel, the B pixel, and the Gb pixel.

Referring to FIG. 3A, the normal pixels included in the image sensor 310 in accordance with the embodiment of the present disclosure may be regularly arranged according to a Bayer pattern.

For example, the image sensor 310 may include a plurality of Bayer regions 311 arranged along the row and column directions. Each Bayer region 311 may include unit regions arranged in 2×2. Each unit region may include a pixel of 1×1. For example, each Bayer region 311 may include a Gr pixel, an R pixel, a B pixel, and a Gb pixel, and the Gr pixel, the R pixel, the B pixel, and the Gb pixel may be arranged in 2×2.

Phase detection pixels 315 may be arranged at positions of some normal pixels among the normal pixels. The phase detection pixels 315 may be arranged at positions adjacent to each other to share one microlens. In an embodiment, the phase detection pixels 315 may include phase detection pixels arranged in 1×2. For example, the phase detection pixels 315 may include a left phase detection pixel LP and a right phase detection pixel RP, which share one microlens. However, this is merely an embodiment, and the phase detection pixels 315 may be implemented in various forms in which the phase detection pixels 315 are arranged in 2×1, 2×2, and the like. Meanwhile, peripheral normal pixels 317 of the phase detection pixels 315 may include pixels most adjacent in row directions, column directions, and diagonal directions of rows and columns with respect to the positions of the phase detection pixels 315. Alternatively, the peripheral normal pixels 317 of the phase detection pixels 315 may include pixels located within a predetermined distance in row directions, column directions, and diagonal directions of rows and columns with respect to the positions of the phase detection pixels 315. Pixel values sensed through the peripheral normal pixels 317 may receive influence such as crosstalk due to the phase detection pixels 315 adjacent to the peripheral normal pixels 317. In accordance with an embodiment of the present disclosure, the electronic apparatus 100 may correct pixel values of pixels included in a noise region among the phase detection pixels 315 and the peripheral normal pixels 317. In the present disclosure, for convenience of description, it is assumed and described that the phase detection pixel 315 includes a left phase detection pixel LP and a right phase detection pixel RP, which share one microlens. The word "predetermined" as used herein with respect to a parameter, such as a predetermined distance, number, minimum limit value, maximum limit value, or value means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

In an embodiment, the phase detection pixels 315 may be regularly arranged for every set unit region 313. The unit region 313 may have a size determined according to an arrangement form of pixels (e.g., a Bayer pattern, a quad Bayer pattern, or the like). For example, the unit region 313 may be a region in which pixels of 6×6 are included. However, this is merely an embodiment, and the size of the unit region 313 may be differently changed. In another embodiment, the phase detection pixels 315 may be arranged at random positions.

Referring to FIG. 3B, a sectional structure 315V of the phase detection pixels 315 and a sectional structure 317V of the peripheral normal pixels 317. In an embodiment, the pixel array 111 may include a microlens layer, a color filter layer, and a sensing circuit layer. The micro lens layer may include a plurality of microlenses. The color filter layer may include a plurality of color filters B, Gb, CF. The sensing circuit layer may include a plurality of sensing circuits PD.

The phase detection pixels 315 may share one microlens 315M. The left phase detection pixel LP may include a color filter 315LF and a sensing circuit 315LP, which are disposed on a left bottom of the one microlens 315M. The right phase detection pixel RP may include a color filter 315RF and a sensing circuit 315RP, which are disposed on a right bottom of the one microlens 315M. In an embodiment, the color filter 315LF of the left phase detection pixel LP and the color filter 315RF of the right phase detection pixel RP may have the same color. For example, the color filter 315LF of the left phase detection pixel LP and the color filter 315RF of the right phase detection pixel RP may have a green color. As the difference between a pixel value sensed in the left phase detection pixel LP and a pixel value sensed in the right phase detection pixel RP becomes larger, a phase difference may become larger (i.e., a state in which a focus is not adjusted). However, this is merely an embodiment, and the color filter 315LF of the left phase detection pixel LP and the color filter 315RF of the right phase detection pixel RP may have different colors.

A peripheral normal pixel located at the left of the phase detection pixels 315 may include a color filter 317F and a sensing circuit 317P, which are disposed on the bottom of one microlens 317M. A peripheral normal pixel located at the right of the phase detection pixels 315 may include a color filter 318F and a sensing circuit 318P, which are disposed on the bottom of one microlens 318M. The microlenses 317M and 318M of the peripheral normal pixels may have a size or curvature different from that of the microlens 315M of the phase detection pixels 315.

Referring to FIG. 3C, the normal pixels included in the image sensor 330 in accordance with the embodiment of the present disclosure may be regularly arranged according to a quad Bayer pattern.

For example, the image sensor 330 may include a plurality of quad Bayer regions 331 arranged along row and column directions. Each quad Bayer region 331 may include unit regions arranged in 2×2. Each unit region may include pixels arranged in 2×2. Pixels of the same color may be included in each unit region. For example, a first unit region may include Gr pixels arranged in 2×2. A second unit region may include R pixels arranged in 2×2. A third unit region may include Gb pixels arranged in 2×2. A fourth unit region may include B pixels arranged in 2×2.

Phase detection pixels 335 may be arranged at positions of some normal pixels among the normal pixels. The phase detection pixels 335 may be arranged at positions adjacent to each other to share one microlens. Meanwhile, peripheral normal pixels 337 of the phase detection pixels 335 may include pixels located within a predetermined distance in row directions, column directions, and diagonal directions of rows and columns with respect to the positions of the phase detection pixels 335. In accordance with an embodiment of the present disclosure, the electronic apparatus 100 may correct pixel values of pixels included in a noise region among the phase detection pixels 335 and the peripheral normal pixels 337.

In an embodiment, the phase detection pixels 335 may be regularly arranged for every set unit region 333. The unit region 333 may have a size determined according to an arrangement form of pixels (e.g., a Bayer pattern, a quad Bayer pattern, or the like). For example, the unit region 333 may be a region in which pixels of 8×8 are included. However, this is merely an embodiment, and the size of the unit region 333 may be changed differently. In another embodiment, the phase detection pixels 335 may be arranged at random positions.

Figure 4:
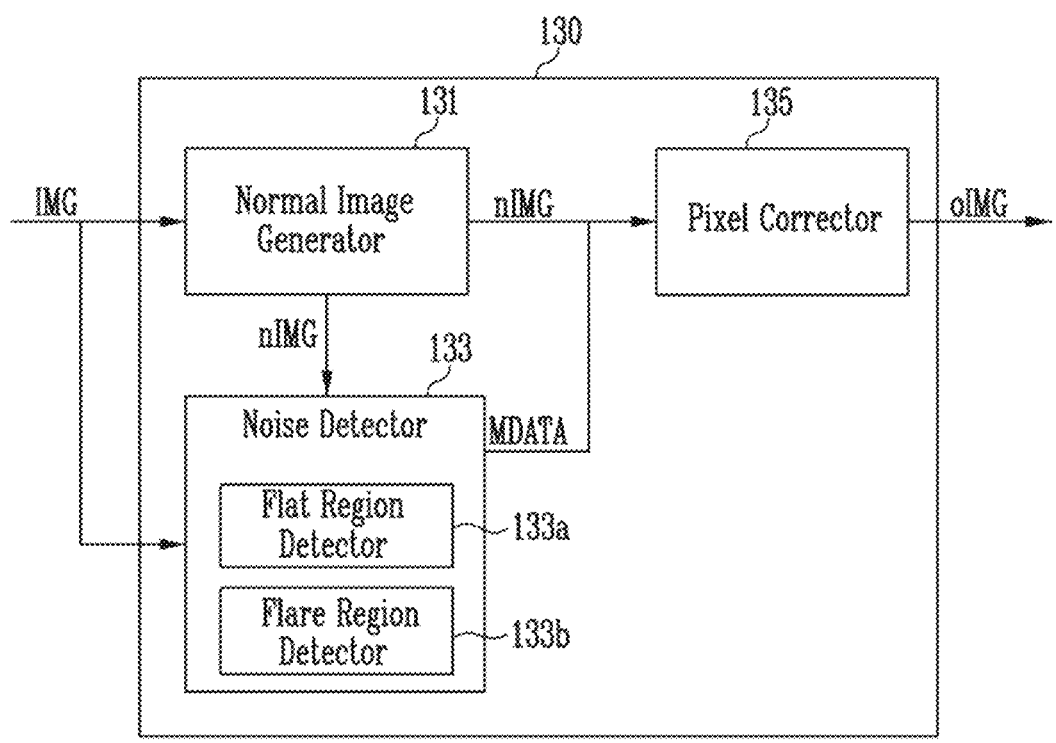
FIG. 4 is a diagram illustrating a processor in accordance with an embodiment of the present disclosure.

FIG. 4 is a diagram illustrating a processor in accordance with an embodiment of the present disclosure.

Referring to FIG. 4, the processor 130 in accordance with the embodiment of the present disclosure may include a normal image generator 131, a noise detector 133, and a pixel corrector 135. In an embodiment, each of the normal image generator 131, the noise detector 133, and the pixel corrector 135 may be implemented as a software module including an instruction, a program, and the like, which the processor 130 performs. The processor 130 or the electronic apparatus 100 may further include a memory which stores the software module. In an embodiment, each of the normal image generator 131, the noise detector 133, and the pixel corrector 135 may be implemented as hardware such as a logic circuit, a part, an ISP, a DSP, an AP, a CPU, or a GPU.

The normal image generator 131 may receive, from the image sensor 110, an image IMG including pixel values sensed through normal pixels and pixel values sensed through phase detection pixels. The normal image generator 131 may acquire compensation pixel values obtained by correcting the pixel values sensed through the phase detection pixels, using pixel values sensed through peripheral normal pixels of each of the phase detection pixels among the normal pixels. The normal image generator 131 may generate a normal image nIMG including the compensation pixel values and the pixel values sensed through the normal pixels. Pixel values included in a noise region among the compensation pixel values may be corrected as final pixel values by the pixel corrector 135.

The noise detector 133 may determine whether each of a plurality of regions included in the normal image nIMG received from the normal image generator 131 is a flat region. Specifically, the noise detector 133 may determine whether a selected region is a flat region, based on pixel values included in the selected region among the plurality of regions of the normal image nIMG.

In accordance with an embodiment, the noise detector 133 may include a flat region detector 133a.

The flat region detector 133a may align a first kernel on the selected region among the plurality of regions of the normal image. When a standard deviation value based on a difference between a central pixel value overlapping with a central region of a plurality of unit regions among a plurality of pixel values included in the selected region and an average of pixel values which overlap with the first kernel and have the same color as the central pixel value is smaller than a first threshold value, the flat region detector 133a may determine that the selected region is a flat region. The first kernel may include a plurality of unit regions corresponding to the arrangement form of the pixel values included in the image.

In accordance with an embodiment, the flat region detector 133a may adjust the first threshold value according to a period to which an average of pixel values included in the selected region belongs among a plurality of periods. The plurality of periods may include a period in which the first threshold value increases as the average of the pixel values Included in the selected region increases.

The noise detector 133 may determine whether each of a plurality of regions included in the image IMG received from the image sensor 110 is a flare region. Specifically, the noise detector 133 may determine whether the selected region is a flare region, based on pixel values sensed through a left phase detection pixel LP and a right phase detection pixel RP, which correspond to the selected region, among the phase detection pixels.

In accordance with an embodiment, the noise detector 133 may include a flare region detector 133b.

When a ratio value of a pixel value sensed through the left phase detection pixel LP and a pixel value sensed through the right phase detection pixel RP exceeds a second threshold value corresponding to the selected region, the flare region detector 133b may determine that the selected region is a flare region. The left phase detection pixel LP and the right phase detection pixel RP may be ones arranged at positions adjacent to each other.

When the selected region is a flare region, the noise detector 133 may generate map data MDATA representing that the selected region is a noise region.

The pixel corrector 135 may determine a noise region among the plurality of regions included in the normal image nIMG, based on the normal image nIMG and the map data MDATA. The pixel corrector 135 may acquire final pixel values obtained by correcting pixel values included in the noise region, using peripheral pixel values of each of the pixel values included in the noise region. The pixel corrector 135 may generate and output an output image oIMG including the final pixel values. This is because a noise occurs in a region satisfying the flat region and the flare region or it is highly likely that a noise occurs in a region satisfying the flat region and the flare region.

The pixel corrector 135 may calculate a correction value, based on a first average value of first peripheral pixel values included in unit regions firstly close to a unit region including a central pixel value among pixel values having the same color as a central pixel value included in the noise region, a second average value of second peripheral pixel values included in unit region secondly close to the unit region including the central pixel value among the pixel values having the same color as the central pixel value included in the noise region, and a correction rate.

The correction rate is a value by which a difference between the first average value and the second average value is multiplied, and may be adjusted according to a dynamic range.

In an embodiment, when the correction value is smaller than a limit value, the pixel corrector 135 may acquire a final pixel value obtained by correcting the central pixel value, based on a sum of the central pixel value and the correction value.

In an embodiment, when the correction value is equal to or greater than the limit value, the pixel corrector 135 may acquire the final pixel value obtained by correcting the central pixel value, based on a sum of the central pixel value and the limit value.

In an embodiment, the central pixel value may be a compensation pixel value obtained by compensating for a pixel value sensed through a phase detection pixel. In another embodiment, the central pixel value may correspond to pixel values sensed through peripheral normal pixels located at the periphery of the phase detection pixel. That is, pixel values sensed through phase detection pixels or peripheral normal pixels among pixel values included in a normal region may be corrected. However, this is merely an embodiment, and the present disclosure is not limited thereto. The pixel values to be corrected may be variously changed.

In an embodiment, the pixel corrector 135 may adjust the correction rate. Specifically, when a difference value between a maximum value and a minimum value of pixel values included in a predetermined number of peripheral regions with respect to a unit region including the central pixel value among the plurality of unit regions is equal to or greater than a cutoff value, the pixel corrector 135 may decrease the correction rate as the difference value increases. The predetermined number of peripheral regions may be regions overlapping with a second kernel. The difference value between the maximum value and the minimum value of the pixel values may be designated as a dynamic range. The cutoff value is a predetermined value, and may be a value smaller than a maximum value of bit data.

In an embodiment, the pixel corrector 135 may adjust the limit value. Specifically, when the central pixel value is equal to or greater than a first reference value and is less than a second reference value as a value greater than the first reference value, the pixel corrector 135 may increase the limit value as the central pixel value increases. When the central pixel value is equal to or greater than the second reference value and is less than a third reference value as a value greater than the second reference value, the pixel corrector 135 decrease the limit value as the central pixel value increases. In an embodiment, when the central pixel value is less than the first reference value or is equal to or greater than the third reference value, the pixel corrector 135 may change the limit value to become a predetermined minimum limit value. When the limit value exceeds a predetermined maximum limit value, the pixel corrector 135 may change the limit value to become the maximum limit value.

In an embodiment, the pixel corrector 135 may select, as central regions, unit regions including any one pixel value among the first peripheral pixel values and the second peripheral pixel values among the plurality of unit regions. The pixel corrector 135 may acquire first peripheral correction pixel values obtained by correcting the first peripheral pixel values and second peripheral correction pixel values obtained by correcting the second peripheral pixel values by using an average pixel value of pixel values included in first peripheral regions corresponding to each of the central regions and an average pixel value of pixel values included in second peripheral region corresponding to each of the central regions. When the correction value is smaller than the limit value, the pixel corrector 135 may acquire, as a final pixel value, a value according to a sum of the central pixel value and the correction value and a weight sum of the first peripheral correction pixel values and the second peripheral correction pixel values.

In an embodiment, when each of the plurality of unit regions includes a pixel value of 1×1, the first peripheral regions may be respectively unit regions firstly close to the central regions among the plurality of unit regions, and the second peripheral regions may be respectively unit regions secondly close to the central regions among the plurality of unit regions.

In an embodiment, when each of the plurality of unit regions includes pixel values of 2×2, the first peripheral regions may be respectively the central regions, and the second peripheral regions may be respectively unit regions firstly close to the central regions among the plurality of unit regions.

Meanwhile, the electronic apparatus 100 in accordance with the embodiment of the present disclosure may include a memory. The memory may be included in the processor 130 or be located at the outside of the processor 130. The memory may store data necessary for driving of the electronic apparatus 100 or the processor 130. The memory may be implemented as a nonvolatile memory element. For example, the memory may be configured as various nonvolatile memory elements such as a Read Only Memory (ROM) capable of only reading data, a One Time Programmable (OTP) memory capable of writing data only once, an Erasable and Programmable ROM (EPROM) capable of erasing and writing stored data, a NAND flash memory, and a NOR flash memory.

FIG. 5 is a diagram illustrating an image processing operation in accordance with an embodiment of the present disclosure.

Referring to FIG. 5, the processor 130 may acquire a normal image 510 from an image 500. The image 500 may include pixel values sensed through normal pixels and phase detection pixels LP and RP of the image sensor 110. The processor 130 may acquire compensation pixel values obtained by correcting the pixel values sensed through the phase detection pixels LP and RP, using pixel values sensed through peripheral normal pixels of the phase detection pixels LP and RP among the normal pixels. That is, the normal image 510 may be one in which the pixel values sensed through the phase detection pixels LP and RP among the pixels included in the image 500 are replaced with the compensation pixel values. For example, the normal image 510 may include the pixel values sensed through the normal pixels and the compensation pixel values. This will be described below with reference to FIG. 6.

The processor 130 may detect a flat region among a plurality of regions of the normal image 510 by using an average and a standard deviation of pixel values included in each of the plurality of regions, and acquire information 530 on the flat region. This will be described below with reference to FIGS. 7A to 7C.

The processor 130 may detect a flare region among a plurality of regions included in the image 500 by using the pixel values sensed through the phase detection pixels LP and RP, and acquire information 550 on the flare region. This will be described below with reference to FIGS. 8A and 8B.

The processor 130 may acquire information 560 on a noise region by using the information 530 on the flat region and the information 550 on the flare region. The noise region may be a region satisfying a condition in which the region is a flare region while being a flat region among a plurality of regions. The information 560 on the noise region may be implemented in various forms including map data, a table, and the like.

The plurality of regions of each of the image 500 and the normal image 510 may correspond to each other. Each of the plurality of regions may be a region including the pixel values sensed through the phase detection pixels LP and RP or the compensation pixel values. Each of the plurality of regions may be a region defined to have a size corresponding to an arrangement form of the pixel values. For example, in the case of a Bayer pattern, each of the plurality of regions may be a region including pixel values arranged in 6×6. In the case of a quad Bayer pattern, each of the plurality of regions may be a region including pixel values arranged in 8×8. However, this is merely an embodiment, and the plurality of regions may be modified and embodied as regions with various sizes.

The processor 130 may determine the noise region among the plurality of regions included in the normal image 510, based on the information 560 on the noise region. The processor 130 may acquire final pixel values C obtained by correcting pixel values included in the noise region of the normal image 510. The processor 130 may generate and output an output Image 570 including the final pixel values C. That is, the output image 570 may be one in which the pixel values included in the noise region among the pixel values included in the normal Image 510 are replaced with the final pixel values C. The pixel values included in the noise region may include the pixel values sensed through the phase detection pixels LP and RP or the pixel values sensed through the peripheral normal pixels of the phase detection pixels LP and RP. This will be described below with reference to FIGS. 9 to 13E.

FIG. 6 is a diagram illustrating an image in accordance with an embodiment of the present disclosure.

Referring to FIG. 6, an image 600 acquired from the image sensor 110 may be converted into a normal image 610.

The image 600 may include a plurality of pixel values. The plurality of pixel values may be arranged in the same arrangement form as a plurality of pixels included in the image sensor 110. The arrangement form may be a Bayer pattern, a quad Bayer pattern, or the like. Hereinafter, for convenience of description, a case where the plurality of pixel values have an arrangement form of the Bayer pattern is assumed and described.

The plurality of pixel values may include pixel values sensed through normal pixels and pixel values sensed through phase detection pixels. The pixel values sensed through the normal pixels may include a Gr pixel value of a green color, a Gb pixel value of the green color, an R pixel value of a red color, and B pixel values of a blue color 601T, 601B, 601L, and 601R. The pixel values sensed through the phase detection pixels may include a pixel value 601C representing a left phase and a pixel value representing a right phase.

According to the Bayer patter, the pixel value 601C representing the left phase may be a position at which the B pixel value is arranged, and the pixel value representing the right phase may be a position at which the Gb pixel value is arranged.

The processor 130 may acquire a B compensation pixel value 611C obtained by correcting the pixel value 601C representing the left phase according to arrangement information representing that the image 600 is the Bayer pattern.

In an embodiment, the processor 130 may acquire, as the compensation pixel value 611C, a value corresponding to the pixel value 601C representing the left phase from calibration information pre-stored in the memory. The calibration information may include values mapped to the pixel values of the phase detection pixels. In addition, another calibration information may be used according to colors or positions of pixel values converted from the pixel values of the phase detection pixels. The calibration information may be generated by using a reference image acquired when the image sensor 100 photographs a light source emitting a constant amount of light.

In an embodiment, the processor 130 may acquire, as the compensation pixel value 611C, an average value of the B pixel values 601T, 601B, 601L, and 601R closest to the pixel value 601C representing the left phase. In an embodiment, the processor 130 may acquire, as the compensation pixel value 611C, a weight sum of the average value of the B pixel values 601T, 601B, 601L, and 601R closest to the pixel value 601C representing the left phase and the pixel value 601C representing the left phase.

In an embodiment, the processor 130 may acquire, as the compensation pixel value 611C, a weight sum of a value corresponding to the pixel value 601C representing the left phase from the calibration information and the average value of the B pixel values 601T, 601B, 601L, and 601R closest to the pixel value 601C representing the left phase.

In a manner similar to this, the processor 130 may acquire a Gb compensation pixel value obtained by correcting the pixel value representing the right phase.

Figure 7A:
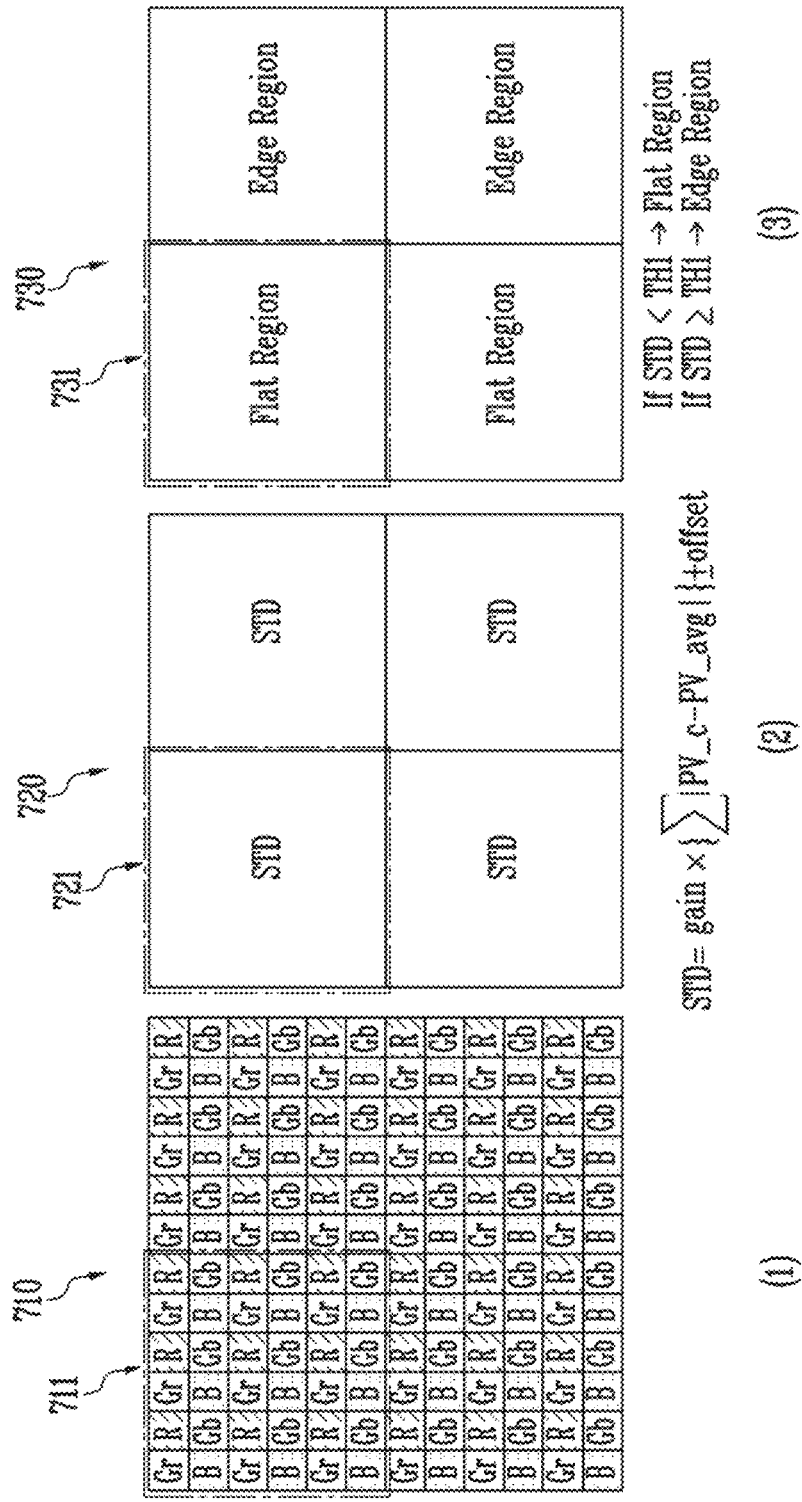
Figure 7B:
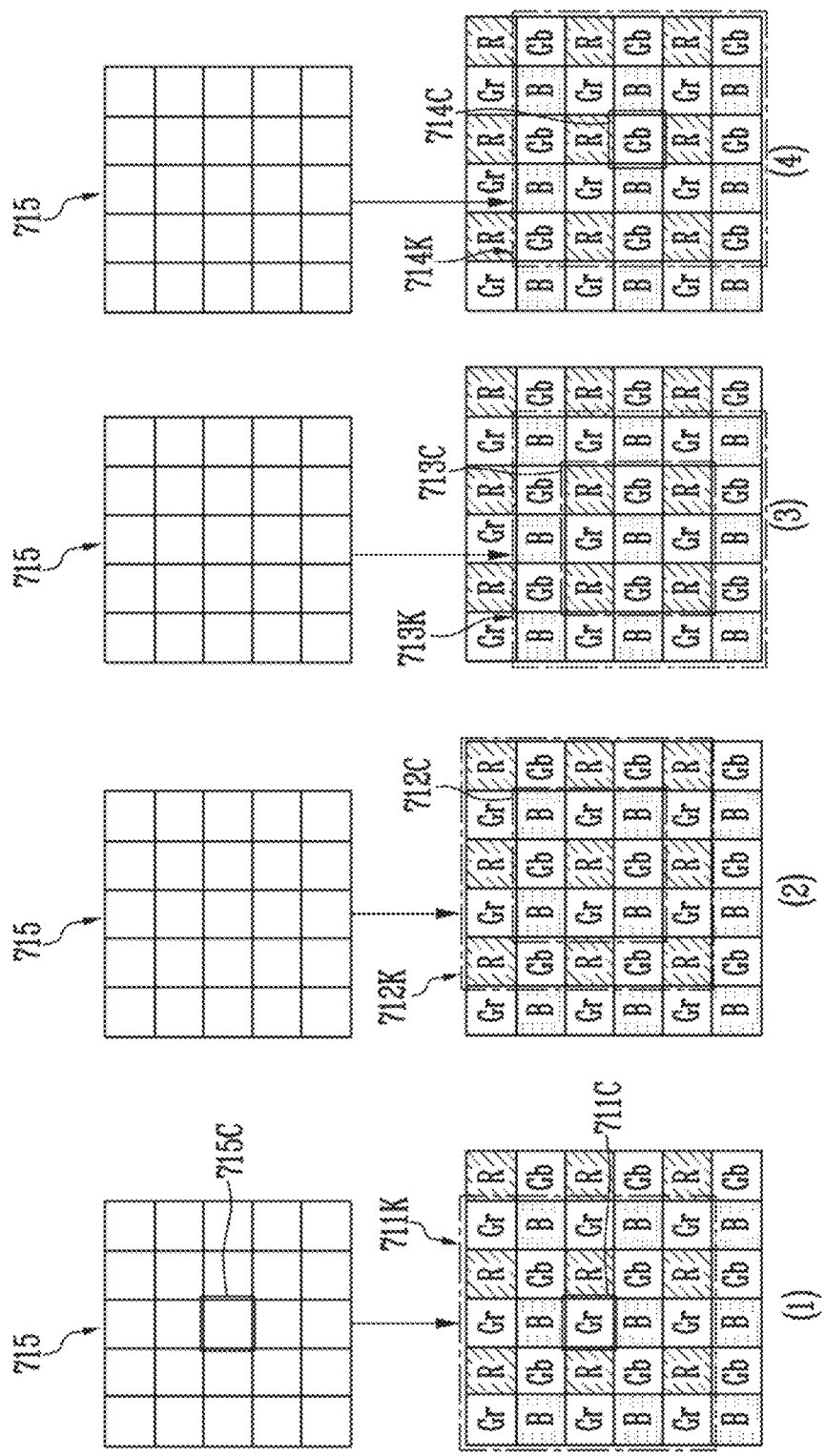

FIGS. 7A to 7C are diagrams illustrating detection of a flat region in accordance with an embodiment of the present disclosure.

Referring to (1) of FIG. 7A, a normal image 710 may include a plurality of regions. The normal image 710 may include a plurality of pixel values. The plurality of pixel values may be arranged in the plurality of regions. Although a case where each of the plurality of regions includes pixel values of 6×6 is illustrated in FIG. 7A, this is merely an embodiment, and each of the plurality of regions may be variously modified and embodied.

Referring to (1) and (2) of FIG. 7A, the processor 130 may select any one region among the plurality of regions. Hereinafter, it is assumed and described that a first region 711 is selected among the plurality of regions.

The processor 130 may calculate a standard deviation STD with respect to a selected first region 721 by using pixel values included in the selected first region 711 among the plurality of regions included in the normal image 710. For example, the processor 130 may calculate the standard deviation STD with respect to the selected first region 721 by using the pixel values included in the first region 711 according to an equation shown in (2) of FIG. 7A.

A gain and an offset may be predetermined constant values. A central pixel value PV_c may be a pixel value located at the center in row and column directions among pixel values included in the selected first region 711 or a partial region of the selected first region 711. An average pixel value PV_avg may be an average value of pixel values of the same color as the central pixel value PV_c among the pixel values included in the selected first region 711 or a partial region of the selected first region 711.

The central pixel value PV_c may be a Gr pixel value or Gb pixel value of a green color. In an embodiment, when the central pixel value PV_c is the Gr pixel value, the average pixel value PV_avg may be an average value of Gr pixel values among the pixel values included in the selected first region 711 or a partial region of the selected first region 711. In another embodiment, when the central pixel value PV_c is the Gr pixel value, the average pixel value PV_avg may be an average value of Gr pixel values and Gb pixel values among the pixel values included in the selected first region 711 or a partial region of the selected first region 711. When the central pixel value PV_c is the Gb pixel value, a manner similar to this may be applied.

The partial region of the selected first region 711 may be a region overlapping with a first kernel.

For example, referring to FIG. 7B, a first kernel 715 may include a plurality of unit regions. The plurality of unit regions may include a central region 715C. The central region 715C may be a unit region located at the center in the row and column directions.

As shown in (1) to (4) of FIG. 7B, the processor 130 may align the first kernel 715 on some regions 711K to 714K of the selected first region 711 along the row and column directions.

As shown in (1) and (4) of FIG. 7B, the processor 130 may acquire, as the above-described central pixel value PV_c, a pixel value 711C or 714C of the green color, which overlaps with the central region 715C of the first kernel 715. Also, the processor 130 may acquire, as the above-described average pixel value PV_avg, an average value of pixel values of the green color, which are included in some regions 711K and 714K overlapping with the plurality of unit regions of the first kernel 715.

Meanwhile, as shown in (2) and (3) of FIG. 7B, when a color of a pixel value overlapping with the central region 715C is not the green color, the processor 130 may acquire, as the above-described central pixel value PV_c, an average value of pixel values of the green color, which are included in regions 712C and 713C overlapping with a peripheral region of the central region 715C of the first kernel 715. Also, the processor 130 may acquire, as the above-described average pixel value PV_avg, an average value of pixel values of the green color, which are included in some regions 712K and 713K overlapping with the plurality of unit regions of the first kernel 715.

Referring back to FIG. 7A, as shown in (2) and (3) of FIG. 7A, the processor 130 may determine whether each of the plurality of regions is a flat region by comparing a standard deviation STD with respect to each of the plurality of regions with a first threshold value.

For example, when the standard deviation STD with respect to the first region 721 is less than the first threshold value, the processor 130 may generate information 730 representing that a first region 731 is a flat region. When the standard deviation STD with respect to the first region 721 is equal to or greater than the first threshold value, the processor 130 may generate the information 730 representing that the first region 731 is an edge region. The flat region is a region in which a pixel value change with a peripheral region is small, and may correspond to a low frequency region in the frequency domain. The edge region is a region in which a pixel value change with a peripheral region is large, and may correspond to a high frequency region in the frequency domain.

Referring to FIGS. 7A and 7C, the processor 130 may adjust a first threshold value TH1 according to the average pixel value PV_avg of the pixel values included in the selected first region 711.

For example, a graph showing mapping information between the average pixel value PV_avg and a reference value TH_STD as shown in (1) of FIG. 7C may include a period in which the reference value TH_STD is maintained as the average pixel value PV_avg increases and a period in which the reference value TH_STD increases as the average pixel value PV_avg increases. The mapping information may be stored in the memory included in the electronic apparatus 100 or the processor 130. The mapping information may be a predetermined graph or function as shown in (1) of FIG. 7C.

As shown in (1) and (2) of FIG. 7C, the processor 130 may acquire the reference value TH_STD corresponding to the average pixel value PV_avg from the mapping information between the average pixel value PV_avg and the reference value TH_STD. Also, the processor 130 may acquire, as the first threshold value TH1, a value obtained by multiplying the reference value TH_STD by a coefficient A and adding a constant B to the multiplied value. Meanwhile, the graph shown in (1) of FIG. 7C is merely an embodiment, and may be variously changed. For example, when a data bit corresponds to 10 bits instead of 8 bits, the maximum value of the average pixel value PV_avg in the graph may be changed to 1023. In addition, the reference value TH_STD in the graph may also be changed.

For example, when the average pixel value PV_avg has a value belonging to a first period in which the average pixel value PV_avg is equal to or greater than 0 and is less than 16, the reference value TH_STD may be maintained as the same value. When the average pixel value PV_avg has a value belonging to a second period in which the average pixel value PV_avg is equal to or greater than 16 and is less than 48, the reference value TH_STD may have a value in proportion to the average pixel value PV_avg. When the average pixel value PV_avg has a value belonging to a third period in which the average pixel value PV_avg is equal to or greater than 48 and is less than 192, the reference value TH_STD may be maintained as the same value. When the average pixel value PV_avg has a value belonging to a third period in which the average pixel value PV_avg is equal to or greater than 192 and is less than 255, the reference value TH_STD may have a value in proportion to the average pixel value PV_avg. In addition, the processor 130 may acquire, as the first threshold value TH1, a value obtained by multiplying the reference value TH_STD by the coefficient A and adding the constant B to the multiplied value.

Figure 8B:
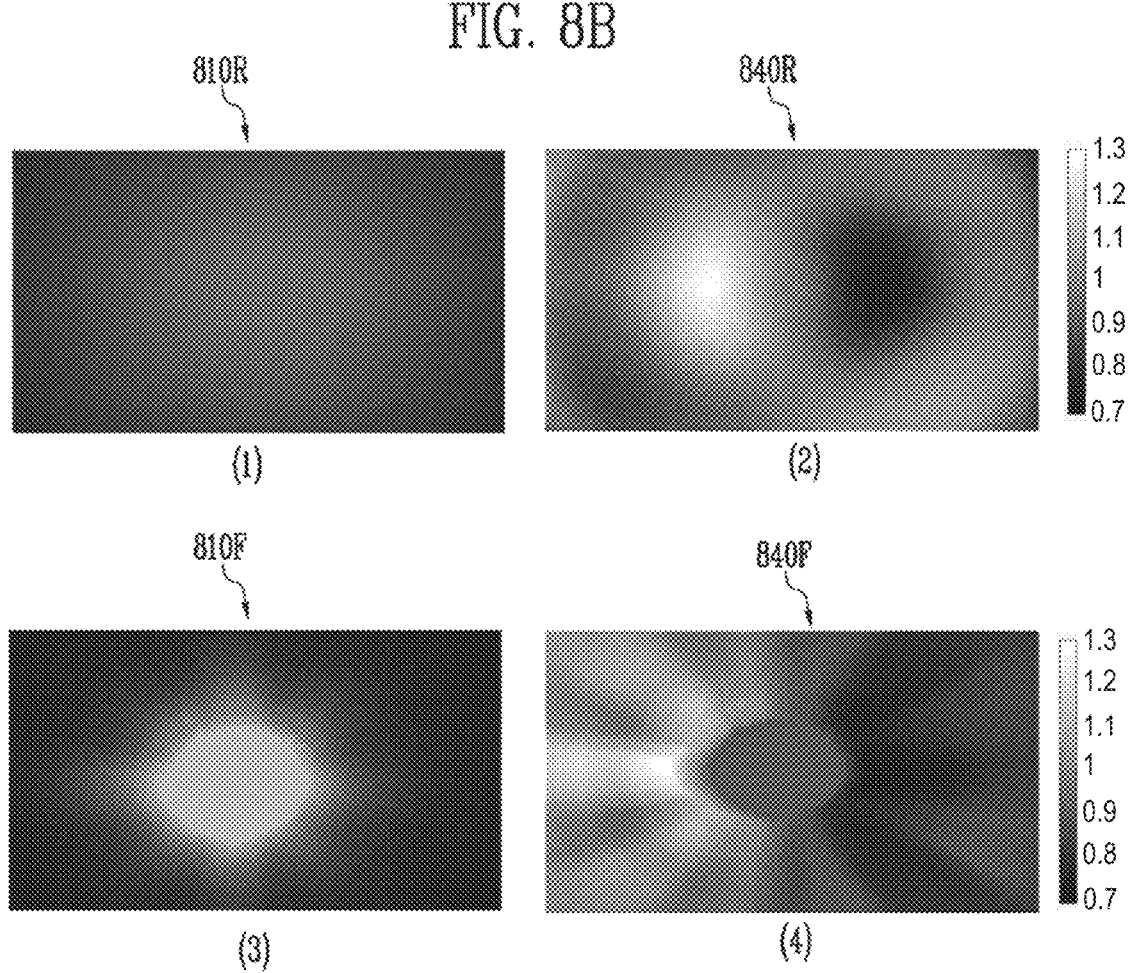

FIGS. 8A and 8B are diagrams illustrating detection of a flare region in accordance with an embodiment of the present disclosure.

Referring to FIGS. 8A and 8B, an image 800 may include a plurality of regions. The image 800 may include a plurality of pixel values. The plurality of pixel values may be arranged in the plurality of regions. The plurality of pixel values may be arranged in the same arrangement form as a plurality of pixels included in the image sensor 110. The arrangement form may be a Bayer pattern, a quad Bayer pattern, or the like. Hereinafter, for convenience of description, a case where the plurality of pixel values have an arrangement form of the Bayer pattern is assumed and described.

The plurality of pixel values may include pixel values sensed through normal pixels and pixel values sensed through phase detection pixels. For example, the pixel values sensed through the normal pixels may include an R pixel value sensed through an R pixel, a B pixel value sensed through a B pixel, a Gb pixel value sensed through a Gb pixel, and a Gr pixel value sensed through a Gr pixel. The pixel values sensed through the phase detection pixels may include a left phase pixel value representing a left phase, which is sensed through a left phase detection pixel LP, and a right phase pixel value representing a right phase, which is sensed through a right phase detection pixel RP.

Referring to (1) and (2) of FIG. 8A, the processor 130 may select any one region among the plurality of regions. For example, the processor 130 may select a region including the left phase pixel value and the right phase pixel value among the plurality of regions. Hereinafter, it is assumed and described that a first region 801 including the left phase pixel value and the right phase pixel value among the plurality of regions included in the image 800 is selected.

The processor 130 may acquire a ratio value LR of a left phase pixel value and a right phase pixel value with respect to a first region 841 by using the left phase pixel value and the right phase pixel value, which are included in the selected first region 801 among the plurality of regions included in the image 800. The processor 130 may acquire phase difference information 840 on each region including the left phase pixel value and the right phase pixel value among the plurality of regions. The phase difference information 840 may include a ratio value LR for each region. The ratio value LR may represent a phase difference.

Referring to (2) and (3) of FIG. 8A, the processor 130 may determine whether the first region 841 is a flare region by comparing the ratio value LR with respect to the first region 841 with a second threshold value TH2.

For example, when the ratio value LR with respect to the first region 841 exceeds the second threshold value TH2, the processor 130 may determine that a first region 851 is a flare region, and generate information 850 representing that the first region 851 is a flare region. When the ratio value LR with respect to the first region 841 is equal to or smaller than the second threshold value TH2, the processor 130 may determine that the first region 851 is a plain region, and generate the information 850 representing that the first region 851 is a plain region. The flare region may include a high luminance region representing a light source having a strong intensity of light, such as the sun or lighting, or an object reflecting strong light, and a peripheral region in which light is spread from the high luminance region. The plain region may be a region representing a general object such as a person, an animal, a thing, or a background, instead of the flare region.

Meanwhile, the second threshold value TH2 of the present disclosure is a predetermined value, and may be stored in the memory. The second threshold value TH2 will be described below with reference to FIG. 8B.

For example, as shown in (1) of FIG. 8B, the image sensor 110 may acquire a reference image 810R in a reference environment. The reference environment may be an environment in which other light sources except a light source outputting light having a color temperature of 3100 k, 5100 k or the like with the same brightness are blocked. A ratio value LR of a left phase pixel value and a right phase pixel value, which are included in each of a plurality of regions included the reference image 810R, may be expressed as a phase difference image 840R shown in (2) of FIG. 8B. The second threshold value TH2 may be a value obtained by performing addition or subtraction on a ratio value LR included in each of a plurality of regions of the phase difference image 840R and a predetermined value. The predetermined value may be a fixed constant value or a percentage value with respect to each ratio value LR. Meanwhile, although light with the same brightness is received to the image sensor 110 in the reference environment, the ratio value LR having the left phase pixel value and the right phase pixel value may have an unequal value according to a region. Therefore, the second threshold value TH2 may be set as different values according to regions.

For example, (3) of FIG. 8B shows an image 810F acquired by sensing a light source having strong light. The image 810F may include a flare region. A ratio value LR of an left phase pixel value and a right phase pixel value, which are included in each of a plurality of regions included in the image 810F, may be expressed as a phase difference image 840F shown in (4) of FIG. 8B. The processor 130 may detect a flare region among the plurality of regions by comparing a ratio value LR included in the currently acquired phase difference image 840F with the second threshold value TH2 included in the pre-acquired phase difference image 840R for each the same region.

Meanwhile, in accordance with an embodiment, a second threshold value TH2 with respect to each of the plurality of regions may be stored in the memory. In another embodiment, some regions among the plurality of regions are used as representative regions, and second threshold values TH2 with respect to the representative regions may be stored in the memory.

FIG. 9 is a diagram illustrating correction of a noise region in accordance with an embodiment of the present disclosure.

Referring to (1) and (2) of FIG. 9, the processor 130 in accordance with the embodiment of the present disclosure may detect a noise region 911 among a plurality of regions included in a normal image 910. The noise region 911 may be a region satisfying a condition in which the region is a flare region while being a flat region among the plurality of regions. This is because it is highly likely that a noise such as a dot noise or a grid noise will appear in the region satisfying the corresponding condition.

The processor 130 may generate an output image 970 including a correction region 971 obtained by correcting the noise region 911. The noise region 911 may include corrected compensation pixel values of phase detection pixels and pixel values of normal pixels. The correction region 971 may include final pixel values obtained by correcting selected pixel values among the pixel values included in the noise region 911. The selected pixel values may be compensation pixels values or peripheral pixel values located within a predetermined distance from each of the compensation pixel values.

In an embodiment, the processor 130 may correct the noise region 911 in units of kernels.

Specifically, the processor 130 may align a second kernel 960 on the noise region 911. The second kernel 960 may include a plurality of unit regions. The plurality of unit regions may be arranged in row and column directions. The plurality of unit regions may include a central region. The central region may be a unit region located at the center in the row and column directions. For example, when the plurality of unit regions are arranged in 5×5, the central region may be a unit region arranged at (3, 3). In another example, when the plurality of unit regions are arranged in 9×9, the central region may be a unit region arranged at (5, 5). At least one pixel value among the pixel values included in the noise region 911 may overlap with each unit region included in the second kernel 960.

The processor 130 may correct a pixel value overlapping with the central region included in the second kernel 960 by using pixel values overlapping with peripheral regions of the central region included in the second kernel 960. The peripheral regions may be regions overlapping with pixel values having the same color as the pixel value overlapping with the central region. The peripheral regions may include first peripheral regions firstly close to the central region and second peripheral regions secondly close to the central region.

For example, when a Bayer pattern is assumed as shown in FIG. 10A, the central region included in the second kernel 960 may overlap with a pixel value arranged at (5, 5). The first peripheral regions included in the second kernel 960 may respectively overlap with pixel values arranged at (4, 4), (4, 6), (6, 4), and (6, 6). The second peripheral regions included in the second kernel 960 may respectively overlap with pixel values arranged at (3, 5), (5, 3), (5, 7), and (7, 7).

Figure 12A:
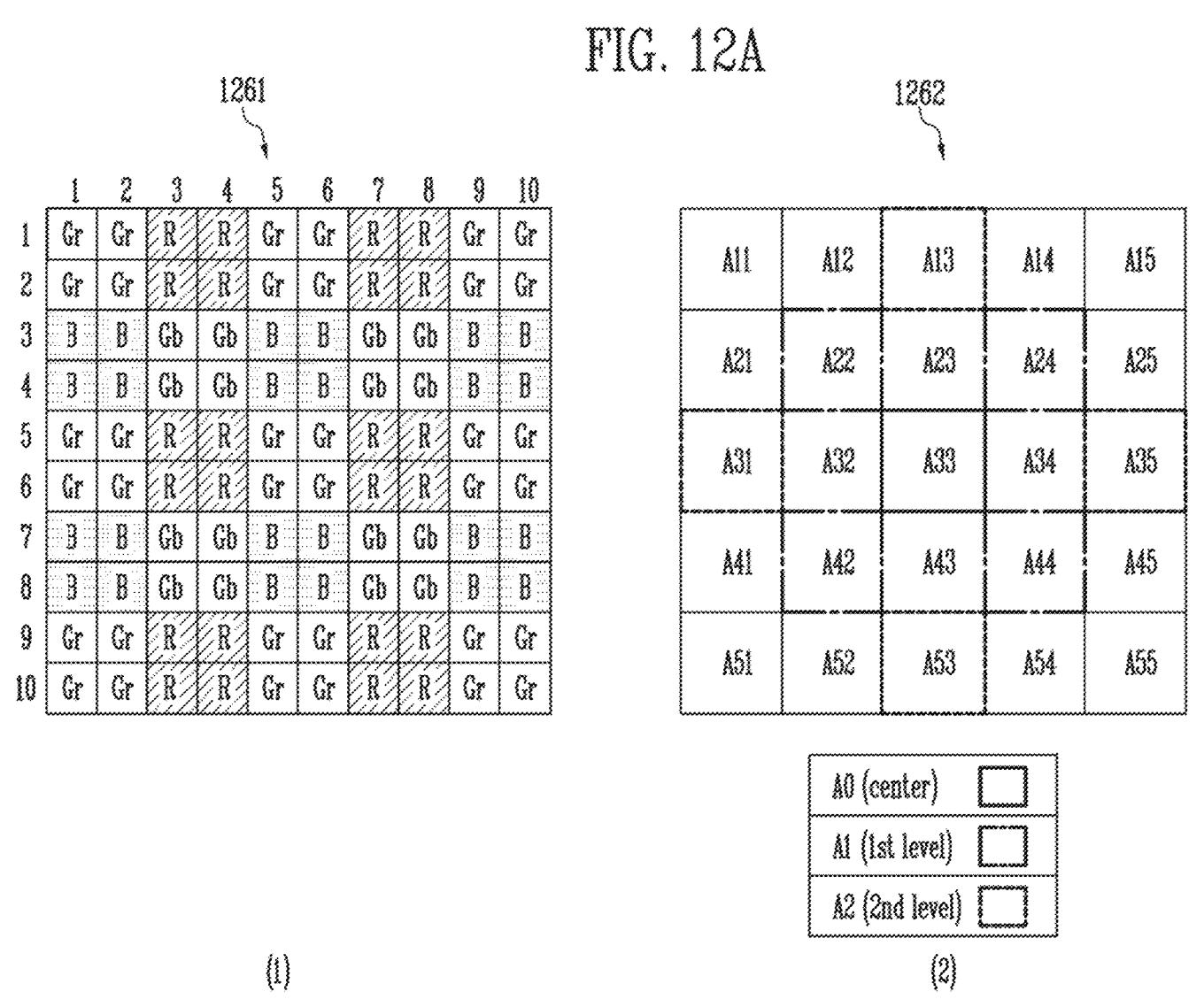

For example, when a quad Bayer pattern is assumed as shown in FIGS. 12A and 13C, the central region included in the second kernel 960 may overlap with a region including pixel values arranged at (5, 5) to (6, 6). The first peripheral regions included in the second kernel 960 may respectively overlap with a region including pixel values arranged at (3, 3) to (4, 4), a region including pixel values arranged at (3, 7) to (4, 8), a region including pixel values arranged at (7, 3) to (8, 4), and a region including pixel values arranged at (7, 7) to (8, 8). The second peripheral region included in the second kernel 960 may respectively overlap with a region including pixel values arranged at (1, 5) to (2, 6), a region including pixel values arranged at (5, 1) to (6, 2), a region including pixel values arranged at (5, 9) to (6, 10), and a region including pixel values arranged at (9, 5) to (10, 6).

In an embodiment, the processor 130 may correct the pixel value overlapping with the central region by using the pixel values overlapping with the first peripheral regions and the pixel values overlapping with the second peripheral regions. In an embodiment, the processor 130 may correct the pixel values overlapping with the first peripheral regions by using pixel values included in a peripheral region of the first peripheral regions. Also, the processor 130 may correct the pixel values overlapping with the second peripheral regions by using pixel values included in a peripheral region of the second peripheral regions. The processor 130 may acquire a final pixel value of the pixel value overlapping with the central region, using correction pixel values obtained by correcting the pixel values overlapping with the first and second peripheral regions and a correction pixel value obtained by correcting the pixel value overlapping with the central region.

Subsequently, the processor 130 may realign the position of the second kernel 960, and acquire the final pixel value of the pixel value overlapping with the central region of the second kernel 960 through the above-described manner. By repeating the above-described operation, the processor 130 may generate the output image 970 including the correction region 971 obtained by correcting the noise region 911. A correction method will be described below with reference to FIGS. 10A to 13E.

FIGS. 10A and 10B are diagrams illustrating primary correction of a central pixel in accordance with an embodiment of the present disclosure.

Referring to (1) of FIG. 10A, the processor 130 may select, as a central pixel value PX0, a pixel value included in any one unit region among a plurality of unit regions included in a noise region 1061. For example, the processor 130 may align a kernel including a plurality of unit regions on the noise region 1061, and select a unit region corresponding to a central region of the kernel as a region including the central pixel value PX0. It is assumed that the central pixel value PX0 is a pixel value P55 arranged at (5, 5).

In an embodiment, each of the plurality of unit regions may include a pixel value of 1×1 as shown in FIGS. 10A to 11C. In another embodiment, each of the plurality of unit regions may include pixel values of 2×2 as shown in FIGS. 12A to 13E.

The pixel value selected as the central pixel value PX0 may be a Gr pixel value or Gb pixel value of a green color. However, this is merely an embodiment, and a pixel value of another color may be selected.

Referring to (2) of FIG. 10A, the processor 130 may acquire a central correction pixel value cPX0 obtained by correcting the central pixel value PX0. The central correction pixel value cPX0 may be a final pixel value or a value for calculating the final pixel value.

Specifically, when a correction value A is smaller than a limit value Limit, the processor 130 may acquire the central correction pixel value cPX0, based on a sum of the central pixel value PX0 and the correction value A. Alternatively, when the correction value A is equal to or greater than the limit value Limit, the processor 130 may acquire the central correction pixel value cPX0, based on a sum of the central pixel value PX0 and the limit value Limit.

The processor 130 may calculate the correction value A, based on a first average value AVG(PX1) of first peripheral pixel values PX1 included in unit regions firstly close to the unit region including the central pixel value PX0 among pixel values having the same color as the central pixel value PX0 included in the noise region 1061, a second average value AVG(PX2) of second peripheral pixel values PX2 included in unit regions secondly close to the unit region including the central pixel value PX0 among the pixel values having the same color as the central pixel value PX0 included in the noise region 1061, and a correction rate rate.

For example, the first peripheral pixel values PX1 may be pixel values which have the same color as the central pixel value PX0 and are firstly close to the central pixel value PX0. The second peripheral pixel values PX2 may be pixel values which have the same color as the central pixel value PX0 and are secondly close to the central pixel value PX0. A pixel value may represent a pixel value closer to the central pixel value PX0 as the order of priority including firstly, secondly, and the like becomes lower.

In an embodiment, the processor 130 may acquire, as the correction value A, a value obtained by multiplying a difference between the first average value AVG(PX1) and the second average value AVG(PX2) by the correction rate and a gain value gain. The gain value gain may be a predetermined value such as 1, ½ or ¼. For example, when the correction rate may be a value in a range of no less than 0 and no more than 1. However, this is merely an embodiment, and the correction rate may be variously modified and embodied.

Referring to (1) of FIG. 10B, the processor 130 in accordance with the embodiment of the present disclosure may adjust the correction rate according to a dynamic range DR. The dynamic range DR may represent a difference value between a maximum value and a minimum value of pixel values included in a predetermined number of peripheral regions with respect to the unit region including the central pixel value PX. For example, the dynamic range DR may represent a difference value between a maximum value and a minimum value among pixel values of 9×9, based on the central pixel value PX. The pixel values may be pixel values of a green color. However, this is merely an embodiment, and the color of pixel values applied to the dynamic range DR may be variously changed.

When the dynamic range DR is equal to or greater than a cutoff value cut-off, the processor 130 may decrease the correction rate as the dynamic range DR increases. When the dynamic range DR is less than the cutoff value cut-off, the processor 130 may apply a constant value. Since a region represents a flat region as the dynamic range DR decreases, the processor 130 may apply the correction value A to become large. Since the region represents an edge region as the dynamic range DR increases, the processor 130 may apply the correction value A to become small. The cutoff value cut-off is a value which becomes a reference for distinguishing the flat region and the edge region from each other, and may be predetermined to be stored in the memory. A maximum value of the dynamic range DR may be a maximum bit value max bit. For example, in the case of 8 bits, the maximum bit value max bit may be 255.

As described above, the processor 130 may adjust the correction rate as a variable value.

Referring to (2) of FIG. 10B, the processor 130 in accordance with the embodiment of the present disclosure may adjust the limit value Limit according to the central pixel value PX0.

For example, when the central pixel value PX0 is equal to or greater than a first reference value and is less than a second reference value, the processor 130 may increase the limit value Limit as the central pixel value PX0 increases. The second reference value may be a value greater than the first reference value. For example, the second reference value may be a medial bit value median bit. For example, in the case of 8 bits, the central bit value median bit may be 128.

When the central pixel value PX0 is equal to or greater than the second reference value and is less than a third reference value, the processor 130 may decrease the limit value Limit as the central pixel value PX0 Increases. The third reference value may be a value greater than the second reference value.

When the central pixel value PX0 is less than the first reference value or is equal to or greater than the third reference value, the processor 130 may change the limit value Limit to become a predetermined minimum limit value Limit min.

A pixel value smaller than the first reference value may represent a dark portion, and a pixel value greater than the third reference value may represent a bright portion. Since a deviation between the Gb pixel value and the Gr pixel value occurs small at the dark portion, the limit value Limit is provided to become small. Since the bright portion is not well recognized due to a visual characteristic of a human, the limit value Limit is provided to become small.

When the limit value Limit exceeds a predetermined maximum limit value Limit max, the processor 130 may change the limit value Limit to become the maximum limit value Limit max. The maximum limit value Limit max may be a value equal to or greater than the maximum bit value max bit.

As described above, the processor 130 may adjust the limit value Limit as a variable value.

Figure 11B:
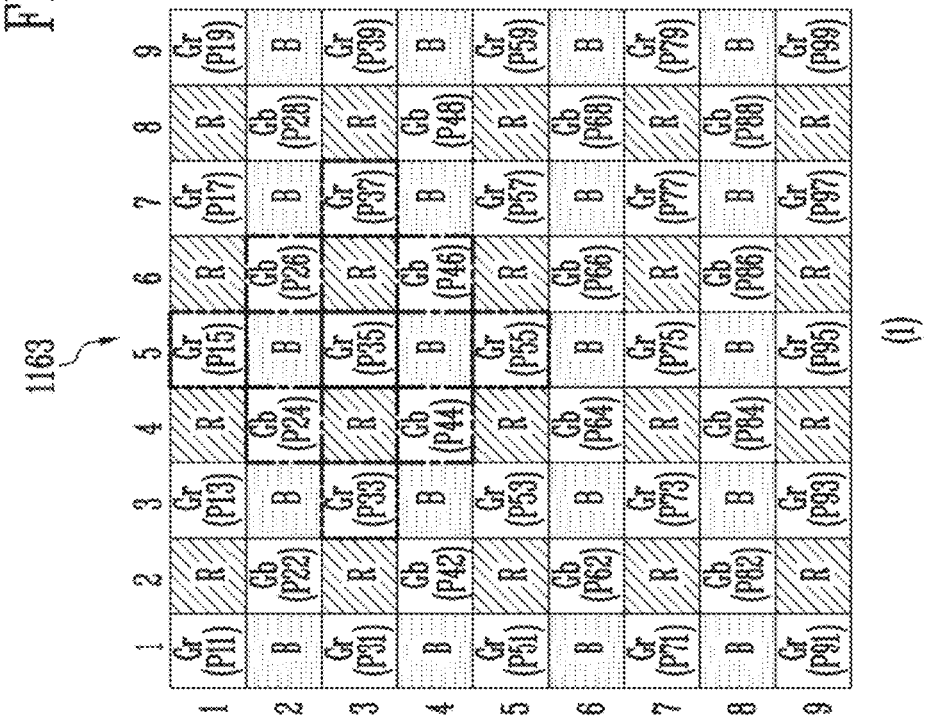

FIGS. 11A and 11B are diagrams illustrating secondary correction of the central pixel in accordance with an embodiment of the present disclosure.

FIG. 11A is a diagram illustrating a method of acquiring peripheral correction pixel values cPX0_p obtained by correcting first peripheral pixel values PX1 (e.g., pixel values P44, P46, P64, and P66 which are located firstly close to the pixel value P55 and have the same color as the pixel value P55) located at the periphery of the central pixel value PX0 (e.g., the pixel value P55) in a noise region 1162. FIG. 11B is a diagram illustrating a method of acquiring peripheral correction pixel values cPX0_p obtained by correcting second peripheral pixel values PX2 (e.g., pixel values P35, P53, P57, and P75 which are located secondly close to the pixel value P55 and have the same color as the pixel value P55) located at the periphery of the central pixel value PX0 (e.g., the pixel value P55) in a noise region 1163. FIG. 11C is a diagram illustrating a method of acquiring a final pixel value fPX0 by using a central correction pixel value cPX0 and the peripheral correction pixel values cPX0_p in the noise region 1163.

Referring to FIGS. 11A to 11C, the processor 130 in accordance with the embodiment of the present disclosure may acquire a final pixel value fPX0 with respect to a central pixel value cPX0 obtained by correcting the central pixel value PX0, using the central correction pixel value cPX0 and peripheral correction pixel values cPX0_p obtained by correcting peripheral pixel values PX0_p.

Referring to FIGS. 10A and 11A, the processor 130 may select, as central regions, unit regions including any one pixel value among the first peripheral pixel values PX1 and the second peripheral pixel values PX2 among the plurality of unit regions.

A first peripheral pixel value P44 located at (4, 4) among the first peripheral pixel values PX1 as shown in (1) of FIG. 11A will be mainly described. The processor 130 may select, as a central region PX0_p, a unit region including the first peripheral pixel value P44, and select first peripheral regions PX1_p firstly close to the central region PX0_p and second peripheral regions PX2_p secondly close to the central region PX0_p.

Also, as shown (2) of FIG. 11A, the processor 130 may acquire a first peripheral correction pixel value cP44 obtained by correcting the first peripheral pixel value P44, using an average pixel value AVG(PX1_p) of pixel values included in the first peripheral regions PX1_p and an average pixel value AVG(PX2_p) of pixel values included in the second peripheral regions PX2_p. For example, the processor 130 may acquire, as the first peripheral correction pixel value cP44, a value obtained by adding the first peripheral pixel value P44 to a value obtained by multiplying a difference between the average pixel value AVG(PX1_p) of the pixel values included in the first peripheral regions PX1_p and the average pixel value AVG(PX2_p) of the pixel values included in the second peripheral regions PX2_p by a gain value gain. The gain value gain is a predetermined value such as 1, ½ or ¼, and may be stored in the memory.

Through a manner identical to this, the processor 130 may acquire other first peripheral correction pixel values cP46, cP64, and cP66 with respect to other first peripheral pixel values P46, P64, and P66.

Referring to FIG. 11B, a second peripheral pixel value P35 located at (3, 5) among the second peripheral pixel values PX2 will be mainly described. The processor 130 may select, as a central region PX0_p, a unit region including the second peripheral pixel value P35, and select first peripheral regions PX1_p firstly close to the central region PX0_p and second peripheral regions PX2_p secondly close to the central region PX0_p.

Also, the processor 130 may acquire a second peripheral pixel value cP35 obtained by correcting the second peripheral pixel value P35, using an average pixel value AVG(PX1_p) of pixel values included in the first peripheral regions PX1_p and an average pixel value AVG(PX2_p) of pixel values included in the second peripheral regions PX2_p. For example, the processor 130 may acquire, as the second peripheral correction pixel value cP35, a value obtained by adding the second peripheral pixel value P35 to a value obtained by multiplying a difference between the average pixel value AVG(PX1_p) of the pixel values included in the first peripheral regions PX1_p and the average pixel value AVG(PX2_p) of the pixel values included in the second peripheral regions PX2_p by a gain value gain. The gain value gain is a predetermined value such as 1, ½ or ¼, and may be stored in the memory.

Through a manner identical to this, the processor 130 may acquire other first peripheral correction pixel values cP53, cP57, and cP75 with respect to other first peripheral pixel values P53, P57, and P75.

Referring to FIG. 11C, the processor 130 may acquire a final pixel value fPX0 with respect to the central pixel value PX0 by using the central correction pixel value cPX0 with respect to the central pixel value PX0 and the peripheral correction pixel values cPX0_p with respect to the peripheral pixel values PX1 and PX2.

The processor 130 may acquire the final pixel value fPX0 with respect to the central pixel value PX0 through the above-described operation by selecting, as the central pixel value PX0, a pixel value included in another unit region among the plurality of unit regions included in the noise region 1061. As described above, by repeating the above-described operation, the processor 130 may acquire a final pixel value fPX0 with respect to each central pixel value PX0. The processor 130 may generate an output image including final pixel values fPX0 obtained by correcting central pixel values PX0.

Meanwhile, in accordance with an embodiment of the present disclosure, the pixel value selected as the central pixel value PX0 may be a pixel value of a phase detection pixel or a compensation pixel value. Also, the pixel value selected as the central pixel value PX0 may be a pixel value of a peripheral normal pixel of the phase detection pixel.

FIGS. 12A to 12E are diagrams illustrating correction of an image having a quad Bayer pattern in accordance with an embodiment of the present disclosure.

Referring to FIG. 12A, (1) of FIG. 12A illustrates an arrangement of pixel values included in a noise region 1261, and (2) of FIG. 12A illustrates unit regions included in the noise region 1261.

A normal image may include the noise region 1261. The noise region 1261 may be divided into a plurality of unit regions 1262. It is assumed and described that each of the plurality of unit regions 1262 includes pixel values of 2×2, which have the same color. This may show that the pixel values are arranged according to a quad Bayer pattern.

Referring to (1) and (2) of FIG. 12A, the processor 130 may select, as a central region, any one unit region among the plurality of unit regions 1262 included in the noise region 1261. For example, the processor 130 may align a kernel including a plurality of unit regions on the noise region 1261, and select, as the central region, a unit region corresponding to a central region of the kernel. It is assumed that a unit region A33 arranged at (3, 3) is selected as the central region. The processor 130 may select, as central pixel values A0, pixel values included in the central region A33.

Referring to FIG. 12B, the processor 130 may acquire central correction pixel values cA0 obtained by correcting the central pixel values A0 included in the central region A33. The central correction pixel value cA0 may be a final pixel value or a value for calculating the final pixel value.

Specifically, when a correction value A is smaller than a limit value Limit, the processor 130 may acquire the central correction pixel values cA0, based on a sum of the central pixel values A0 and the correction value A. Alternatively, when the correction value A is equal to or greater than the limit value Limit, the processor 130 may acquire the central correction pixel values cA0, based on a sum of the central pixel values A0 and the limit value Limit.

The processor 130 may calculate the correction value A, based on a first average value AVG(A1) of first peripheral pixel values A1 included in unit regions A22, A24, A42, and A44 firstly close to the unit region A33 including the central pixel values A0 among pixel values having the same color as the central pixel values A0 included in the noise region 1261, a second average value AVG(A2) of second peripheral pixel values A2 included in unit regions A13, A31, A35, and A53 secondly close to the unit region A33 including the central pixel values A0 among the pixel values having the same color as the central pixel values A0 included in the noise region 1261, and a correction rate.

The first average value AVG(A1) may be an average value of an average value of pixel values included in a first unit region A22, an average value of pixel values included in a second unit region A24, an average value of pixel values included in a third unit region A42, and an average value of pixel values included in a fourth unit region A44.

The second average value AVG(A2) may be an average value of an average value of pixel values included in a fifth unit region A13, an average value of pixel values included in a sixth unit region A31, an average value of pixel values included in a seventh unit region A35, and an average value of pixels included in an eight unit region A53.

The processor 130 in accordance with the embodiment of the present disclosure may adjust the correction rate according to a dynamic range DR. The processor 130 in accordance with the embodiment of the present disclosure may adjust the limit value Limit according to an average value of the central pixel values A0. Since this has already been described above, the detailed description will be omitted.

FIGS. 12C and 12D are used to describe unit regions used for correction of pixel values among a plurality of unit regions 1263, 1264, 1265, and 1266.

Referring to FIGS. 12A and 12C, the processor 130 may correct first peripheral pixel values A1 by using peripheral pixel values of the first peripheral pixel values A1. The first peripheral pixel values A1 may be pixel values included in unit regions A22, A24, A42, and A44 firstly close to a central region A33 including central pixel values A0 among pixel values of the same color as the central pixel values A0. The processor 130 may select, as a new central region A0_p, any one unit region among the unit regions A22, A24, A42, and A44 including the first peripheral pixel values A1. It is assumed that, as shown in FIG. 12C, a first unit region A22 may be selected as the central region A0_p, and unit regions A11, A13, A31, A33 are selected as peripheral regions A1_p closest to the central region A0_p.

The processor 130 may acquire correction pixel values cA22 with respect to the first unit region A22, based on pixel values included in the first unit region A22, an average value AVG(A22) of the pixel values included in the first unit region A22, and an average pixel value AVG(AVG(A11), AVG(A13), AVG(A31), and AVG(A33) of pixel values included in peripheral regions A11, A13, A31, and A33 firstly close to the first unit region A22. For example, the processor 130 may acquire, as a peripheral correction pixel value cA22_p with respect to the first unit region A22, a value obtained by adding a pixel value included in the first unit region A22 to a value obtained by multiplying a difference between the average value AVG(A22) of the pixel values included in the first unit region A22 and the average pixel value AVG(AVG(A11), AVG(A13), AVG(A31), and AVG(A33) of pixel values included in peripheral regions A11, A13, A31, and A33 firstly close to the first unit region A22 by a gain value gain. The gain value gain is a predetermined value such as 1, ½ or ¼, and may be stored in the memory.

Through a manner identical to this, the processor 130 may acquire peripheral correction pixel values cA24, cA42, and cA44 with respect to other unit regions A24, A42, and A44 as shown in FIG. 12D.

Figure 12E:
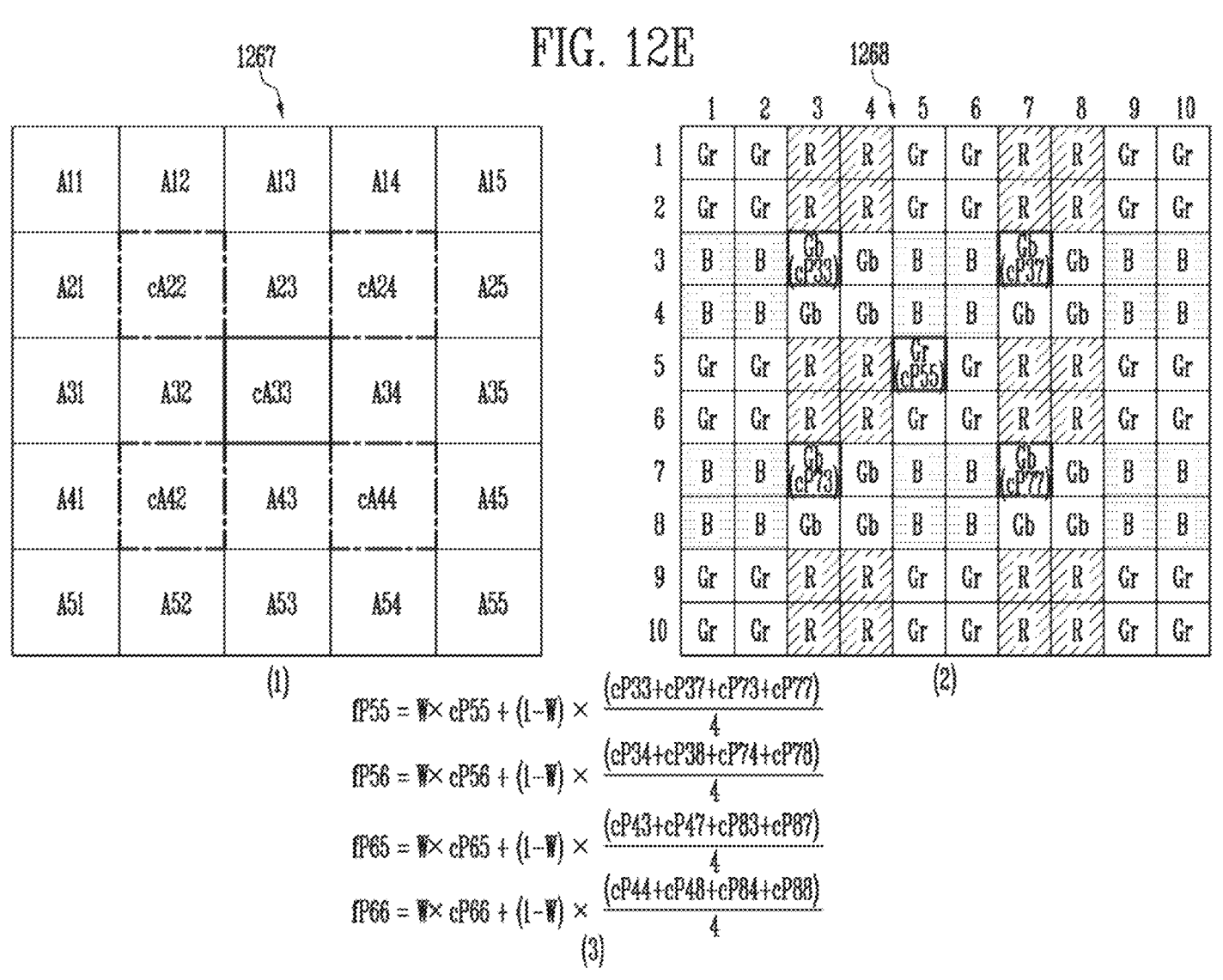

(1) of FIG. 12E is used to describe unit regions used for correction of pixel values among a plurality of unit regions 1267, and (2) of FIG. 12E is used to describe pixel values used for correction of pixel values in a noise region 1268. (3) of FIG. 12E is used to describe an equation used for correction of pixel values.

Referring to FIG. 12E, the processor 130 may acquire final pixel values fP55 to fP66 by using central correction pixel values cA0 and peripheral correction pixel values cA22, cA24, cA42, and cA44.

For example, in the plurality of unit regions 1262 included in the noise region 1261 shown in FIG. 12A, pixel values included in some regions A33, A22, A24, A42, and A44 among the plurality of unit regions 1262 may be corrected. The corrected regions may include a corrected central region cA33 and corrected peripheral regions cA22, cA24, cA42, and cA44.

The processor 130 may select one central correction pixel value cP55 among central correction pixel values cP55, cP56, cP65, and cP66 included in the corrected central region cA33, and select peripheral correction pixel values cP33, cP37, cP73, and cP77 located at the same arrangement position as the selected central correction pixel value cP55 among peripheral correction pixel values included in the corrected peripheral regions cA22, cA24, cA42, and cA44. The processor 130 may acquire, as a final pixel value fP55 with respect to the central pixel value P55, a value according to a weight sum of the selected central correction pixel value cP55 and an average value of the selected peripheral correction pixel values cP33, cP37, cP73, and cP77. A weight W may be a value of 0 to 1. Through a manner shown in (3) of FIG. 12E, the processor 130 may acquire final pixel values fP56, fP65, and fP66 with respect to central pixel values P56, P65, and P66.

The processor 130 may repeatedly acquire final pixel values fP55, fP56, fP65, and fP66 with respect to central pixel values P55, P56, P65, and P66 through the above-described operation by selecting, as a central region, another unit region among the plurality of unit regions 1262 included in the noise region 1261. The processor 130 may generate an output image including the acquired final pixel values fP55, fP56, fP65, and fP66.

FIGS. 13A to 13E are diagrams illustrating correction of an image having a quad Bayer pattern in accordance with an embodiment of the present disclosure.

Referring to FIGS. 13A to 13E, a normal image may include a noise region 1361. The noise region 1361 may be divided into a plurality of unit regions 1362. It is assumed and described that each of the plurality of unit regions 1362 includes pixel values of 2×2, which have the same color. This may represent that the pixel values are arranged according to a quad Bayer pattern.

Figure 13A:
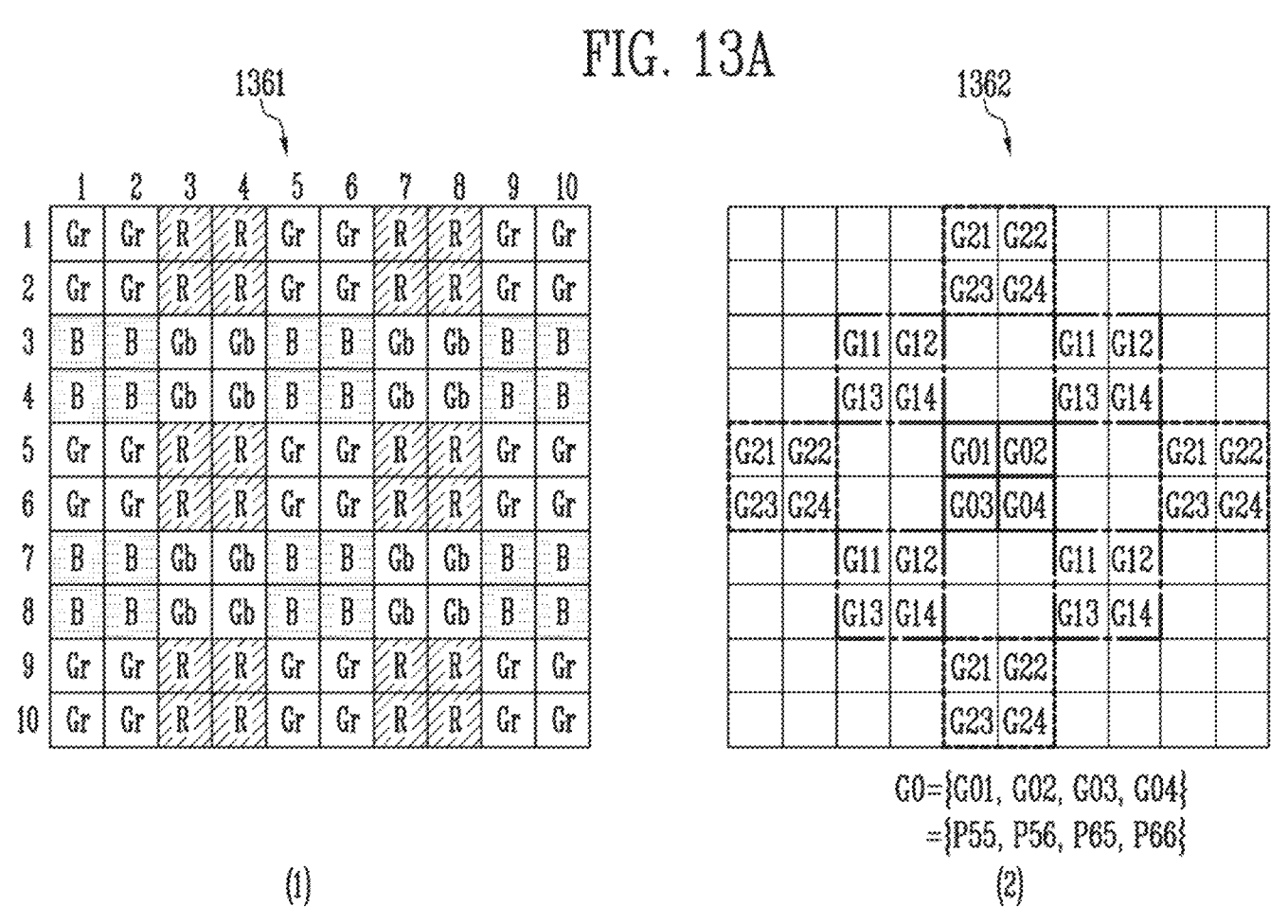

Referring (1) and (2) of FIG. 13A, the processor 130 may select, as a central region, any one region among the plurality of unit regions 1362 included in the noise region 1361. For example, the processor 130 may align a kernel including a plurality of unit regions on the noise region 1361, and select, as the central region, a unit region corresponding to a central region of the kernel. It is assumed that a unit region including central pixel values G0 is selected as the central region.

As shown in FIG. 13B, when a correction value A is smaller than a limit value Limit, the processor 130 may acquire central correction pixel values cG0, based on a sum of the central pixel values G0 and the correction value A. Alternatively, when the correction value A is equal to or greater than the limit value Limit, the processor 130 may acquire the correction pixel values cG0, based on a sum of the central pixel values G0 and the limit value Limit.

The processor 130 may calculate the correction value A, based on a first average value AVG(G1), a second average value AVG(G2), and a correction rate. For example, the processor 130 may calculate the correction value A by multiplying a difference between the first average value AVG(G1) and the second average value AVG(G2) by the correction rate and a gain value gain.

The processor 130 may calculate the first average value AVG(G1) of an average value of pixel values G11 arranged at a first position in a first unit regions firstly close to the unit region including the central pixel values G0, an average value of pixel values G12 arranged at a second position in the first unit regions, an average value of pixel values G13 arranged at a third position in the first unit regions, and an average value of pixel values G14 arranged at a fourth position in the first unit regions.

The processor 130 may calculate the second average value AVG(G2) of an average value of pixel values G21 arranged at a first position in second unit region secondly close to the unit region including the central pixel values G0, an average value of pixel values G22 arranged at a second position in the second unit regions, an average value of pixel values G23 arranged at a third position in the second unit regions, and an average value of pixel values G24 arranged at a fourth position in the second unit regions.

The processor 130 in accordance with the embodiment of the present disclosure may adjust the correction rate according to a dynamic range DR. The processor 130 in accordance with the embodiment of the present disclosure may adjust the limit value Limit according to an average value of the central pixel values G0.

Figure 13D:
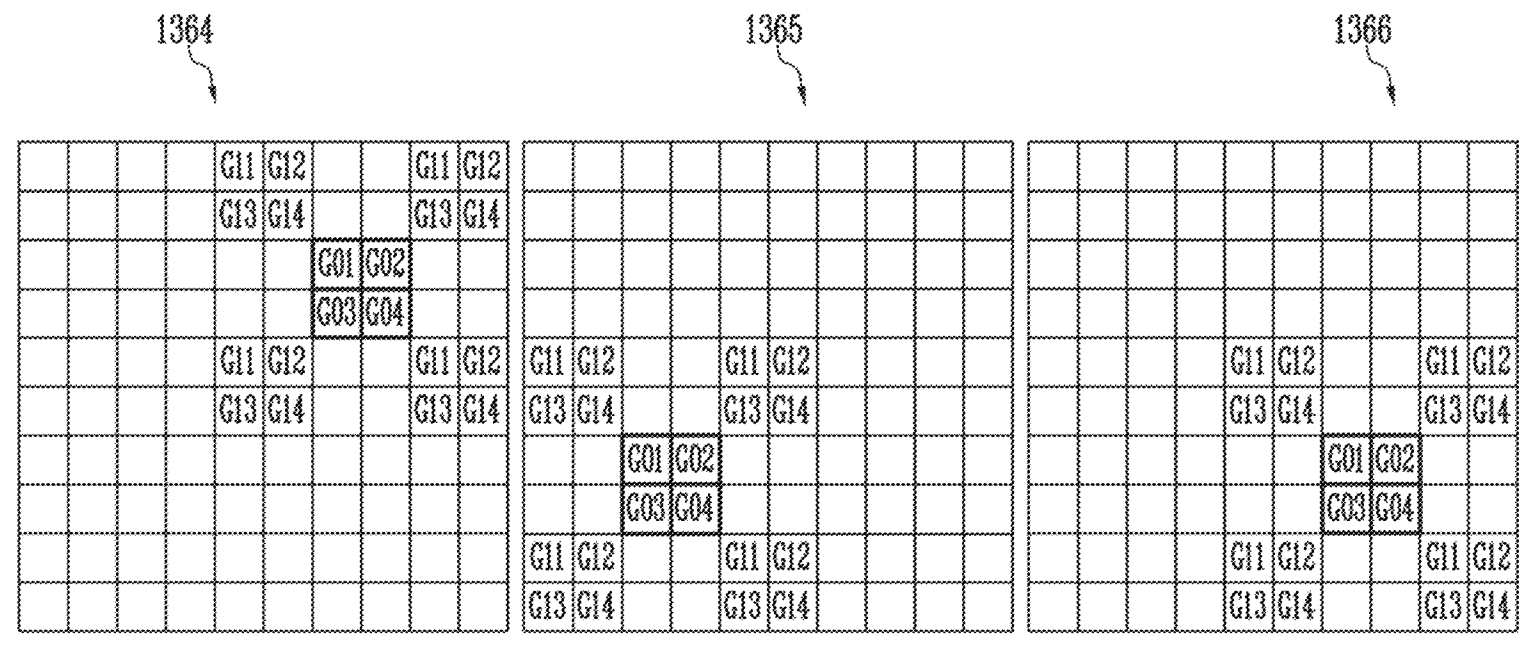

FIGS. 13C and 13D illustrates which regions unit regions used for correction of pixel values among a plurality of unit regions 1363, 1364, 1365, and 1366 are.

Referring to FIGS. 13C and 13D, the processor 130 may correct first peripheral pixel values G11 to G14 by using peripheral pixel values of the first peripheral pixel values G11 to G14. The processor 130 may select, as a new central region G0_p, any one unit region among unit regions including the first peripheral pixel values G11 to G14. It is assumed that a unit region including pixel values arranged at (3, 3) to (4, 4) is selected as the new central region G0_p.

The processor 130 may acquire correction pixel values cG0_p with respect to the new central region G0_p, based on pixel values included in the new central region G0_p, an average value AVG(G0_p) of the pixel values included in the new central region G0_p, and an average pixel value AVG (AVG(G11), AVG(G12), AVG(G13), and AVG(G14) of pixel values included in first peripheral regions firstly closed to the new central region G0_p. Since the acquired correction pixel values cG0_p are ones with respect to a peripheral region of the previous central region G0_p to prevent confusion, the acquired correction pixel values cG0_p are designated as peripheral correction pixel values cG0_p.

The average pixel value AVG(AVG(G11), AVG(G12), AVG(G13), and AVG(G14) of the pixel values included in the first peripheral regions may be an average value of an average value of pixel values G11 arranged at a first position in the first unit regions, an average value of pixel values G12 arranged at a second position in the first unit regions, an average value of pixel values G13 arranged at a third position in the first unit regions, and an average value of pixel values G14 arranged at a fourth position in the first unit regions.

Through a manner identical to this, as shown in FIG. 13D, the processor 130 may acquire peripheral correction pixel values with respect to pixel values G01, G02, G03, and G04 included in the new central region G0_p.

(1) of FIG. 13E is used to describe unit regions used for correction of pixel values among a plurality of unit regions 1367, and (2) of FIG. 13E is used to describe pixel values used for correction of pixel values in a noise region 1368. (3) of FIG. 13E is used to describe an equation used for correction of pixel values.

Referring to FIG. 13E, the processor 130 may acquire a final pixel value fP55 by using central correction pixel values cP55 and peripheral correction pixel values cP33, cP37, cP73, and cP77. For example, the processor 130 may determine peripheral correction pixel values included in peripheral regions most adjacent to a unit region including the central correction pixel values cP55 among pixel values having the same color as the central correction pixel values cP55, and select the peripheral correction pixel values cP33, cP37, cP73, and cP77 at the same position as the central correction pixel values cP55 among peripheral correction pixel values included in peripheral regions. Also, the processor 130 may acquire, as the final pixel value fP55, a value according to an average value of the peripheral correction pixel values cP33, cP37, cP73, and cP77 at the same position as the central correction pixel values cP55 and a weight sum of the central correction pixel values cP55. A weight W may be a value of 0 to 1. Through the same manner as (3) of FIG. 13E, the processor 130 may acquire final pixel values fP56, fP65, and fP66 with respect to central pixel values P56, P65, and P66.

The processor 130 may repeatedly acquire final pixel values fP55, fP56, fP65, and fP66 with respect to central pixel values P55, P56, P65, and P66 through the above-described operation by selecting, as a central region, another unit region among the plurality of unit regions 1362 included in the noise region 1361. The processor 130 may generate an output image including the acquired final pixel values fP55, fP56, fP65, and fP66.

Figure 14:
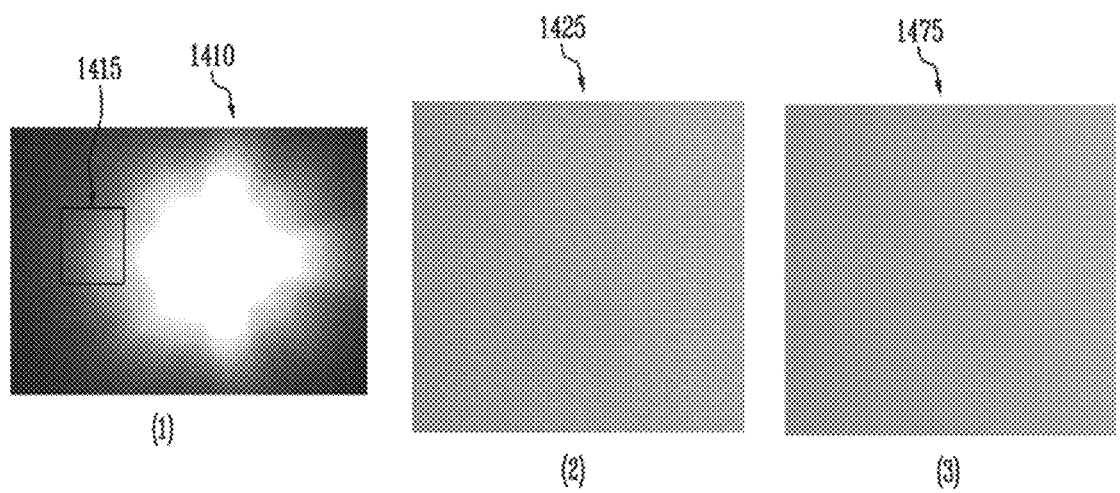
FIG. 14 is a diagram illustrating a correction result of a noise region in accordance with an embodiment of the present disclosure.

FIG. 14 is a diagram illustrating a correction result of a noise region in accordance with an embodiment of the present disclosure.

Referring to (1) of FIG. 14, a normal image 1410 acquired by the electronic apparatus 100 may include a flare region. When a noise region 1415 which is a flat region while being a flare region among a plurality of regions included in the normal image 1410 is enlarged, this may appear as shown in (2) of FIG. 14. In a noise region 1425 enlarged as shown in (2) of FIG. 14, a dot noise as a pixel value representing a difference equal to or greater than a constant value from a peripheral pixel value may appear according to a position.

In accordance with an embodiment of the present disclosure, the electronic apparatus 100 may correct pixel values included in the noise region 1415 among the plurality of regions included in the normal image 1410. When a correction region obtained by correcting the noise region 1415 is enlarged, this may appear as shown in (3) of FIG. 14. Pixel values may uniformly appear in a correction region 1475 enlarged as shown in (3) of FIG. 14. As described above, the electronic apparatus 100 in accordance with the embodiment of the present disclosure can remove the noise of the noise region 1425.

Figure 15:
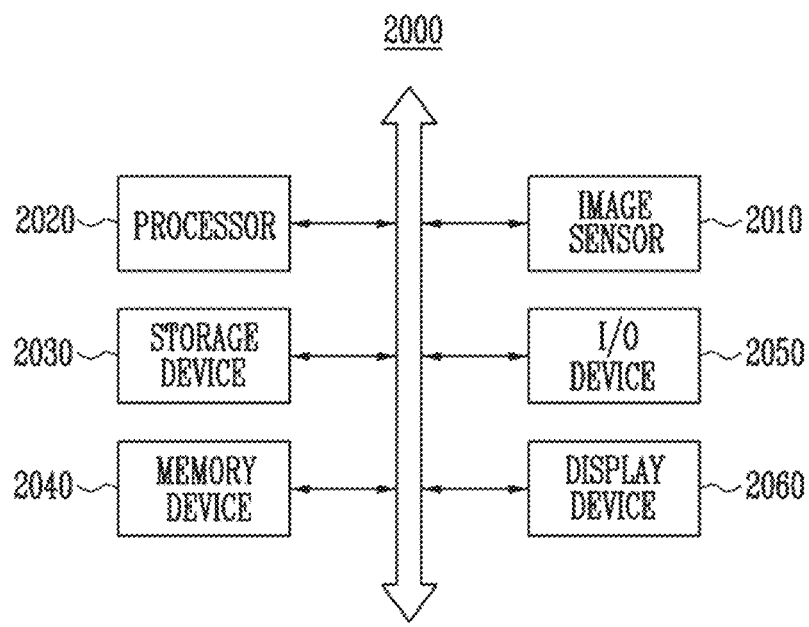
FIG. 15 is a diagram illustrating an implementation example of an electronic apparatus in accordance with an embodiment of the present disclosure.

FIG. 15 is a diagram illustrating an implementation example of an electronic apparatus in accordance with an embodiment of the present disclosure.

Referring to FIG. 15, the electronic apparatus 100 may be implemented as a computing system 2000. The computing system 2000 may include an image sensor 2010, a processor 2020, a storage device 2030, a memory device 2040, an input/output (I/O) device 2050, and a display device 2060. Although not shown in FIG. 15, the computing system 2000 may further include a port capable of communicating with the storage device 2030, the memory device 2040, the I/O device 2050, the display device 2060, and the like, or communicating with an external device.

The image sensor 2010 may acquire an image. The image sensor 2010 may be connected to the processor 2020 through an address bus, a control bus, and a data bus, or a communication line different therefrom, to perform communication.

The image sensor 2010 may be implemented with a various types of packages. For example, at least some components of the image sensor 2010 may be implemented by using packages such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi-Chip Package (MCP), Wafer-level Fabricated Package (WFP), or Wafer-level processed Stack Package (WSP). In some embodiments, the image sensor 2010 may be integrated together with the processor 2020 in one chip, or the image sensor 2010 and the processor 2020 may be integrated in different chips.

The processor 2020 may include at least one of a Central Processing Unit (CPU), an Application Processing Unit (APU), a Graphic Processing Unit (GPU), and the like.

The processor 2020 may be connected to the storage device 2030, the memory device 2040, and the I/O device 2050 through the address but, the control bus, and the data bus, to perform communication. In accordance with an embodiment of the present disclosure, the processor 2020 may also be connected to an expansion bus such as a Peripheral Component Interconnect (PCI) bus.

The storage device 2030 may store data including an image, a motion map, and the like. The data stored in the storage device 2030 may be preserved not only when the computing system 2000 is driven but also when the computing system 2000 is not driven. For example, the storage device 2030 may be configured with at least one all types of nonvolatile memory devices such as a flash memory device, a Solid State Drive (SSD), a Hard Disk Drive (HDD), and an optical disk.

The memory device 2040 may store data including an image, a motion map, and the like. The memory device 2040 may temporarily store data to be processed by the processor 2020 or temporarily store data processed by the processor 2020. The data stored in the memory device 2040 may be preserved only when the computing system 2000 is driven. Alternatively, the data stored in the memory device 2040 may be preserved not only when the computing system 2000 is driven but also when the computing system 2000 is not driven. For example, the memory device 2040 may include volatile memory devices such as a Dynamic Random Access Memory (DRAM) and a Static Random Access Memory (SRAM), and nonvolatile memory devices such as an Erasable Programmable Read Only Memory (EPROM), an Electrically Erasable Programmable Read Only Memory (EEPROM), and a flash memory device.

The I/O device 2050 may include an input device and an output device. The input device is a device capable of inputting a command of a user through interaction, and may be implemented as, for example, a keyboard, a keypad, a mouse, a microphone, or the like. The output device is a device capable of outputting data, and may be implemented as a printer, a speaker, or the like.

The display device 2060 is a device for visually outputting an image. To this end, the display device 2060 may be implemented with various types of displays such as a Liquid crystal Display (LCD) for controlling the molecular arrangement of liquid crystals, using a separate backlight unit (e.g., a light emitting diode (LED), etc.) as a light source, thereby adjusting a degree to which light emitted from the backlight unit is transmitted through the liquid crystals (brightness of light or intensity of light), and a display using, a light source, a self-luminous element (e.g., a mini LED having a size of 100 to 200 μm, a micro LED having a size of 100 μm or less, an Organic LED (OLED), a Quantum dot LED (QLED), and the like). The display device 2060 may emit, to the outside, lights of red, green, and blue colors, which correspond to the output image.

FIG. 16 is a diagram illustrating an operating method of an electronic apparatus in accordance with an embodiment of the present disclosure.

Referring to FIG. 16, the operating method of the electronic apparatus in accordance with the embodiment of the present disclosure may include step S1610 of generating a normal image, based on a plurality of pixel values sensed through normal pixels and phase detection pixels, step S1620 of detecting a noise region in a flare region included in the normal image, and step S1630 of generating an output image including final pixel values obtained by correcting pixel values included in the noise region, using peripheral pixel values of each of the pixel values.

Specifically, the electronic apparatus 100 may generate a normal image, based on a plurality of pixel values sensed through normal pixels and phase detection pixels (S1610).

In an embodiment, the electronic apparatus 100 may acquire compensation pixel values obtained by correcting pixel values sensed through the phase detection pixels, using pixel values sensed through peripheral normal pixels of each of the phase detection pixels among the normal pixels. The electronic apparatus 100 may generate the normal image including the compensation pixel values and the pixel values sensed through the normal pixels.

Also, the electronic apparatus 100 may detect a noise region in a flare region included in the normal image (S1620).

In an embodiment, the electronic apparatus 100 may determine whether a selected region among the plurality of region of the normal image is a flat region, based on pixel values included in the selected region. The electronic apparatus 100 may determine whether the selected region is the flare region, based on pixel values sensed through a left phase detection pixel and a right phase detection pixel, which correspond to the selected region among the phase detection pixels. When the selected region is the flare region while being the flat region, the electronic apparatus 100 may detect that the selected region is the noise region.

Also, the electronic apparatus 100 may generate an output image including final pixel values obtained by correcting pixel values, using peripheral pixel values of each of pixels included in the noise region (S1630).

In an embodiment, the electronic apparatus 100 may select, as a central pixel value, a pixel value included in any one unit region among a plurality of unit regions included in the noise region. The electronic apparatus 100 may calculate a correction value, based on a first average value of first peripheral pixel values included in unit regions firstly close to the unit region including the central pixel value included in the noise region among pixel values having the same color as the central pixel value, a second average value of second peripheral pixel values included in unit regions secondly close to the unit region including the central pixel value included in the noise region among the pixel values having the same color as the central pixel value, and a correction rate. When the correction value is smaller than a limit value, the electronic apparatus 100 may acquire a final pixel value obtained by correcting the central pixel value, based on a sum of the central pixel value and the correction value.

In accordance with the present disclosure, there can be provided an electronic apparatus for removing a noise in a flare region and an operating method of the electronic apparatus.

While the present disclosure has been shown and described with reference to certain examples of embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described examples of embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the examples of embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An electronic apparatus comprising:
   an image sensor including normal pixels and phase detection pixels; and
   a processor configured to:
   detect a noise region in a flare region included in a normal image generated based on a plurality of pixel values sensed through the normal pixels and the phase detection pixels; and
   generate an output image including final pixel values obtained by correcting pixel values included in the noise region, using peripheral pixel values of each of the pixel values,
   wherein the processor includes a noise detector configured to determine a flat region in the flare region among a plurality of regions of the normal image as the noise region.

2. The electronic apparatus of claim 1, wherein the processor includes a normal image generator configured to:

acquire compensation pixel values obtained by correcting pixel values sensed through the phase detection pixels, using pixel values sensed through peripheral normal pixels of each of the phase detection pixels among the normal pixels; and generate the normal image including the compensation pixel values and pixel values sensed through the normal pixels.

3. The electronic apparatus of claim 2, wherein each of the pixel values included in the noise region is any one compensation pixel value among the compensation pixel values.

4. The electronic apparatus of claim 1, wherein the noise detector is further configured to:

determine whether a selected region among the plurality of regions of the normal image is the flat region based on pixel values included in the selected region;

determine whether the selected region is the flare region, based on pixel values sensed through a left phase detection pixel and a right phase detection pixel, which correspond to the selected region among the phase detection pixels; and generate map data representing that the selected region is the noise region, when the selected region is the flare region while being the flat region.

5. The electronic apparatus of claim 4, wherein the noise detector includes a flat region detector configured to:

align a kernel including a plurality of unit regions on the selected region among the plurality of regions of the normal image; and determine that the selected region is the flat region, when a standard deviation value based on a difference between a central pixel value overlapping with a central region of the plurality of unit regions among a plurality of pixel values included in the selected region and an average of pixel values which overlap with the kernel and have the same color as the central pixel value is smaller than a first threshold value.

6. The electronic apparatus of claim 5, wherein the flat region detector adjusts the first threshold value according to a period to which an average of the pixel values included in the selected region belongs among a plurality of periods, and wherein the plurality of periods include a period in which the first threshold value increases as the average of the pixel values included in the selected region increases.

7. The electronic apparatus of claim 4, wherein the noise detector includes a flare region detector configured to determine the selected region as the flare region, when a ratio value of a pixel value sensed through the left phase detection pixel and a pixel value sensed through the right phase detection pixel exceeds a second threshold value corresponding to the selected region.

8. The electronic apparatus of claim 1, wherein the processor includes a pixel corrector configured to:

select, as a central pixel value, a pixel value included in any one unit region among a plurality of unit regions included in the noise region;

calculate a correction value, based on a first average value of first peripheral pixel values included in unit regions firstly close to the unit region including the central pixel value included in the noise region among pixel values having the same color as the central pixel value, a second average value of second peripheral pixel values included in a unit region secondly close to the unit region including the central pixel value among the pixel values having the same color as the central pixel value, and a correction rate; and acquire a final pixel value obtained by correcting the central pixel value, based on a sum of the central pixel value and the correction value, when the correction value is smaller than a limit value.

9. The electronic apparatus of claim 8, wherein each of the plurality of unit regions includes a pixel value of 1×1 or pixel values of 2×2.

10. The electronic apparatus of claim 8, wherein, when the correction value is equal to or greater than the limit value, the pixel corrector acquires the final pixel value obtained by correcting the central pixel value, based on a sum of the central pixel value and the limit value.

11. The electronic apparatus of claim 8, wherein, when a difference value between a maximum value and a minimum value of pixel values included in a predetermined number of peripheral regions with respect to the unit region including the central pixel value among the plurality of unit regions is equal to or greater than a cutoff value, the pixel corrector decreases the correction rate as the difference value increases.

12. The electronic apparatus of claim 8, wherein the pixel corrector:

increases the limit value as the central pixel value increases, when the central pixel value is equal to or greater than a first reference value and is less than a second reference value as a value greater than the first reference value; and decreases the limit value as the central pixel value increases, when the central pixel value is equal to or greater than the second reference value and is less than a third reference value as a value greater than the second reference value.

13. The electronic apparatus of claim 12, wherein the pixel corrector changes the limit value to become a predetermined minimum limit value, when the central pixel value is less than the first reference value or is equal to or greater than the third reference value; and changes the limit value to become a predetermined maximum limit value, when the limit value exceeds the maximum limit value.

14. The electronic apparatus of claim 8, wherein the pixel corrector:

selects, as central regions, unit regions including any one pixel value among the first peripheral pixel values and the second peripheral pixel values among the plurality of unit regions;

acquires first peripheral correction pixel values obtained by correcting the first peripheral pixel values and second peripheral correction pixel values obtained by correcting the second peripheral pixel values, using an average pixel value of pixel values included in first peripheral regions corresponding to each of the central region and an average pixel value of pixel values included in second peripheral regions corresponding to each of the central regions; and acquires, as the final pixel value, a value according to the sum of the central pixel value and the correction value and a weight sum of the first peripheral correction pixel values and the second peripheral correction pixel values, when the correction value is smaller than the limit value.

15. The electronic apparatus of claim 14, wherein each of the first peripheral regions corresponds to unit regions firstly close to each of the central regions among the plurality of unit regions, when each of the plurality of unit regions includes a pixel value of 1×1, and each of the second peripheral regions corresponds to unit regions secondly close to each of the central regions among the plurality of unit regions, when each of the plurality of unit regions includes a pixel value of 1×1.

16. The electronic apparatus of claim 14, wherein each of the first peripheral regions corresponds to each of the central regions, when each of the plurality of unit regions includes pixel values of 2×2, and each of the second peripheral regions corresponds to unit regions firstly close to each of the central regions among the plurality of unit regions, when each of the plurality of unit regions includes a pixel value of 2×2.

17. A method of operating an electronic apparatus, the method comprising:

generating a normal image, based on a plurality of pixel values sensed through normal pixels and phase detection pixels;

detecting a noise region in a flare region included in the normal image; and generating an output image including final pixel values obtained by correcting pixel values included in the noise region, using peripheral pixel values of each of the pixel values, wherein the detecting of the noise region includes determining a flat region in the flare region among a plurality of regions of the normal image as the noise region.

18. The method of claim 17, wherein the generating of the normal image includes:

acquiring compensation pixel values obtained by correcting pixel values sensed through the phase detection pixels, using pixel values sensed through peripheral normal pixels of each of the phase detection pixels among the normal pixels; and generating the normal image including the compensation pixel values and pixel values sensed through the normal pixels.

19. The method of claim 17, wherein the determining of the flat region includes:

determining whether a selected region among the plurality of regions of the normal image is the flat region, based on pixel values included in the selected region;

determining whether the selected region is the flare region, based on pixel values sensed through a left phase detection pixel and a right phase detection pixel, which correspond to the selected region among the phase detection pixels; and detecting that the selected region is the noise region, when the selected region is the flare region while being the flat region.

20. The method of claim 17, wherein the generating of the output image includes:

selecting, as a central pixel value, a pixel value included in any one unit region among a plurality of unit regions included in the noise region;

calculating a correction value, based on a first average value of first peripheral pixel values included in unit regions firstly close to the unit region including the central pixel value included in the noise region among pixel values having the same color as the central pixel value, a second average value of second peripheral pixel values included in unit region secondly close to the unit region including the central pixel value among the pixel values having the same color as the central pixel value, and a correction rate; and acquiring a final pixel value obtained by correcting the central pixel value, based on a sum of the central pixel value and the correction value, when the correction value is smaller than a limit value.

* * * * *